US012640003B2

(12) United States Patent
Sutherland et al.

(10) Patent No.: US 12,640,003 B2
(45) Date of Patent: May 26, 2026

(54) GAMING DEVICES AND METHODS FOR OPERATING A GAMING DEVICE

(71) Applicant: NOVOMATIC AG, Gumpoldskirchen (AT)

(72) Inventors: Benjamin Raz Sutherland, Portland, CA (US); Andrew Hieke, Concord, CA (US)

(73) Assignee: NOVOMATIC AG, Gumpoldskirchen (AT)

( * ) Notice: Subject to any disclaimer, the term of this patent is extended or adjusted under 35 U.S.C. 154(b) by 473 days.

(21) Appl. No.: 18/183,221

(22) Filed: Mar. 14, 2023

(65) Prior Publication Data

US 2024/0312293 A1 Sep. 19, 2024

(51) Int. Cl.
*G07F 17/32* (2006.01)

(52) U.S. Cl.
CPC ...... *G07F 17/3213* (2013.01); *G07F 17/3267* (2013.01)

(58) Field of Classification Search
CPC ............. G07F 17/3211; G07F 17/3213; G07F 17/3216; G07F 17/3244; G07F 17/3267; G07F 17/3297
See application file for complete search history.

(56) References Cited

U.S. PATENT DOCUMENTS 3,897,951 A * 8/1975 Morrison ................ A63F 7/025 273/124 A
5,120,060 A * 6/1992 Parker ................. G07F 17/3297 273/138.2
5,388,828 A * 2/1995 Takemoto ............... G07F 17/34 273/121 B
5,405,143 A * 4/1995 Takemoto ............... G07F 17/32 273/121 B
5,722,656 A * 3/1998 Dickerson ............... A63F 7/027 273/119 R
6,656,040 B1 * 12/2003 Brosnan .................. G07F 17/32 463/19
6,769,982 B1 * 8/2004 Brosnan .................. G07F 17/32 463/16
8,128,476 B1 * 3/2012 Sidhu .................. A63F 3/00643 463/16
8,366,532 B1 * 2/2013 Nicely ................ G07F 17/3213 463/31
8,366,533 B1 * 2/2013 Nicely ................ G07F 17/3267 463/16
8,444,474 B2 * 5/2013 Jaffe ....................... G07F 17/32 463/16

(Continued)

*Primary Examiner* — Chase E Leichliter
(74) *Attorney, Agent, or Firm* — 2SPL Patent Attorneys PartG mbB; Kieran O'Leary

(57) ABSTRACT

Various examples relate to a gaming device. The gaming device comprises a processor arrangement comprising at least one processor; and a memory arrangement for storing a plurality of instructions, which when executed by the processor arrangement, causes the processor arrangement to cause display a graphical user interface of a gaming environment on a display device, wherein the gaming environment comprises a plurality of obstacles and a plurality of rotating structures in a first region of the gaming environment, and a moving structure in the second region of the gaming environment.

19 Claims, 22 Drawing Sheets

(56) References Cited

U.S. PATENT DOCUMENTS

| | | | | |
|---|---|---|---|---|
| 8,544,846 | B2 * | 10/2013 | Watanabe | G07F 17/38 273/138.3 |
| 8,992,297 | B2 * | 3/2015 | De Waal | G07F 17/32 463/16 |
| 11,276,269 | B2 * | 3/2022 | Pellegrini | G07F 17/3209 |
| 2002/0066996 | A1 * | 6/2002 | Nelson | A63F 7/027 273/118 R |
| 2004/0002380 | A1 * | 1/2004 | Brosnan | A63F 13/573 463/32 |
| 2004/0222585 | A1 * | 11/2004 | Moffett, VI | G07F 17/32 273/118 R |
| 2005/0035542 | A1 * | 2/2005 | Hosaka | G07F 17/3297 273/120 R |
| 2011/0118000 | A1 * | 5/2011 | Jaffe | G07F 17/32 463/20 |
| 2011/0312409 | A1 * | 12/2011 | Vancura | G07F 17/3281 463/25 |
| 2013/0053123 | A1 * | 2/2013 | Nicely | G07F 17/3295 463/20 |
| 2013/0079087 | A1 * | 3/2013 | Brosnan | G07F 17/3262 463/16 |
| 2013/0281170 | A1 * | 10/2013 | Weiss | G07F 17/3244 463/20 |
| 2014/0080556 | A1 * | 3/2014 | Knutsson | A63F 13/92 463/7 |
| 2015/0187163 | A1 * | 7/2015 | Brosnan | G07F 17/32 463/2 |
| 2016/0275747 | A1 * | 9/2016 | Brosnan, Jr. | A63F 13/573 |
| 2018/0082535 | A1 * | 3/2018 | Filipour | G07F 17/3209 |
| 2019/0147706 | A1 * | 5/2019 | Bolling, Jr. | G07F 17/3211 463/2 |
| 2020/0005587 | A1 * | 1/2020 | Hartl | G07F 17/3213 |
| 2020/0175809 | A1 * | 6/2020 | Jadeja | G07F 17/3239 |
| 2020/0242890 | A1 * | 7/2020 | Miller | G07F 17/3244 |
| 2024/0312293 | A1 * | 9/2024 | Sutherland | G07F 17/3213 |

* cited by examiner

Case 1c2x

750

GAMING DEVICES AND METHODS FOR OPERATING A GAMING DEVICE

TECHNICAL FIELD

Various examples described herein relate to games of chance and in particular to gaming devices and methods for operating a gaming device.

BACKGROUND

Gaming devices, machines, or consoles are popular elements of the gaming industry. In order to encourage interest from players, game developers invent new and innovative ways of representing games, gameplay, and awards. Trajectory games, for example, may introduce falling balls into a gaming environment. Pachinko games are an example of a trajectory game. In a Pachinko game, falling balls may enter a gaming environment, where they encounter obstacles or pegs before exiting the gaming environment. If a ball exits the gaming environment via a certain outlet, a bonus event or game may be triggered. Pinball games are another example of a trajectory game. In pinball games, mechanical flippers are located near an exit of the gaming environment. A player may activate or control the movement of the mechanical flippers to redirect the ball away from the exit.

SUMMARY

Various examples relate to gaming devices and methods for operating a gaming device.

Various examples relate to a gaming device, comprising a processor arrangement comprising at least one processor and a memory arrangement for storing a plurality of instructions. The plurality of instructions, when executed by the processor arrangement, causes the processor arrangement to: (a) cause the display of a gaming environment on a display device, wherein the gaming environment comprises a plurality of obstacles and a plurality of rotating structures in a first region of the gaming environment, and a moving structure in a second region of the gaming environment; (b) receive information related to a wager value and information related to a quantity of objects for play of a game; (c) cause display of a plurality of objects in the gaming environment, wherein the plurality of obstacles and the plurality of rotating structures influence the motion of the plurality of objects in the gaming environment, wherein the plurality of rotating structures are configured for catching and releasing objects in the gaming environment; (d) cause display of an outcome of the game based on landing outcomes of the plurality of objects with respect to the moving structure.

Various embodiments relate to a method of operating a gaming device. The method comprises causing display of a gaming environment on a display device, wherein the gaming environment comprises a plurality of obstacles and a plurality of rotating structures in a first region of the gaming environment, and a moving structure in a second region of the gaming environment. The method comprises receiving information related to a wager value and information related to a quantity of objects for play of a game. The method comprises receiving a signal initiating play of a game. The method comprises causing display of a plurality of objects in the gaming environment, wherein the plurality of obstacles and the plurality of rotating structures influence the motion of the plurality of objects in the gaming environment, wherein the plurality of rotating structures are configured for catching and releasing objects in the gaming environment.

The method comprises causing display of an outcome of the game based on landing outcomes of the plurality of objects with respect to the moving structure.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
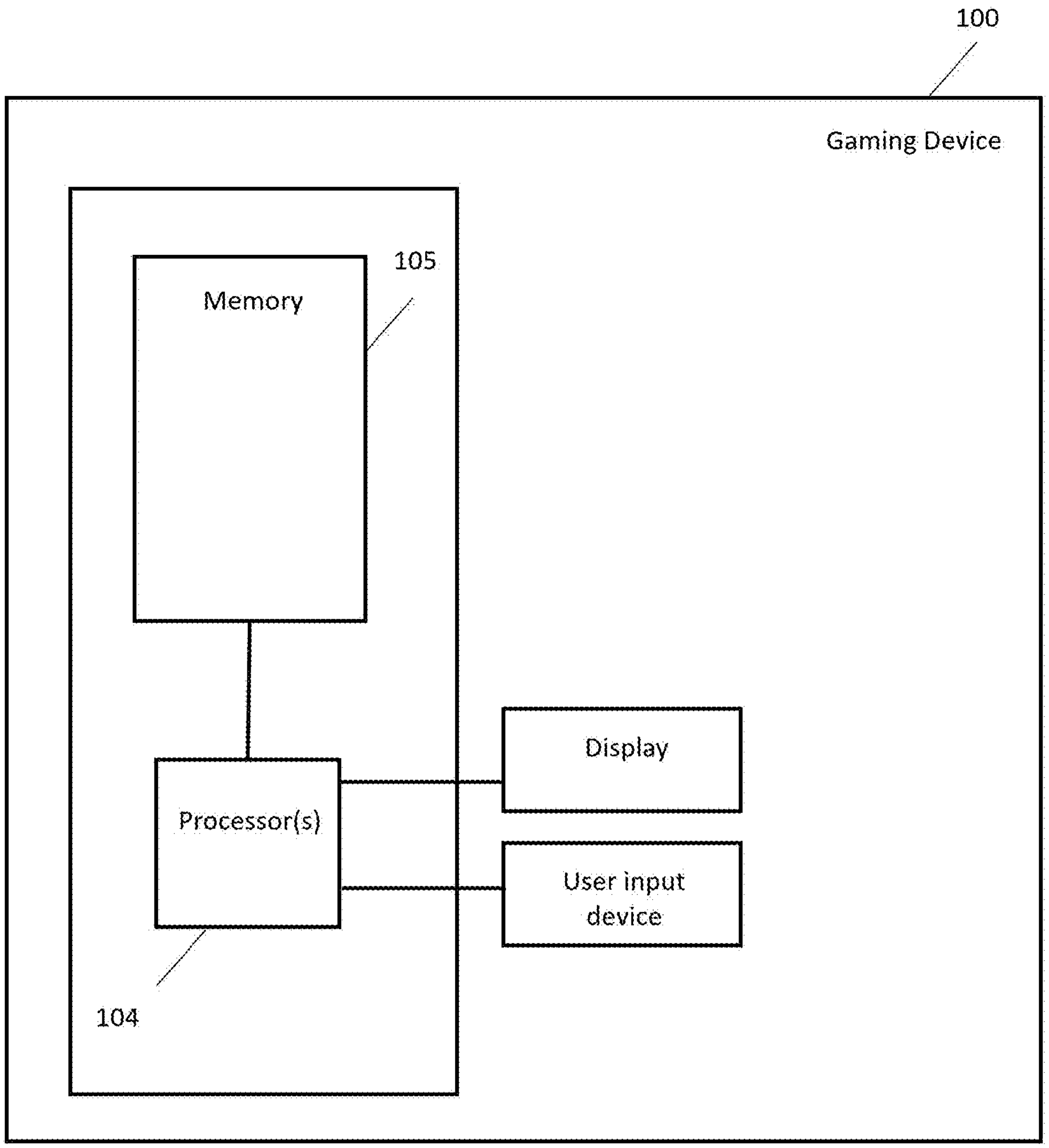
FIGS. 1A and 1B show schematic illustrations of a gaming device according to various embodiments.

The detailed description of various embodiments makes reference to the accompanying drawings, which show the exemplary embodiments by way of illustration. Thus, the detailed description herein is presented for purposes of illustration only and not for limitation. Throughout the description of the figures, the same or similar reference numerals refer to the same or similar elements and/or features, which may be identical or implemented in a modified form while providing the same or a similar function. The thickness of lines, layers, and/or areas in the figures may also be exaggerated for clarity.

It will be understood that when an element is referred to as being "connected" or "coupled" to another element, the elements may be directly connected or coupled or via one or more intervening elements. If two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements. If a singular form, such as "a", "an", and "the" is used and the use of only a single element is not defined as mandatory either explicitly or implicitly, further examples may also use several elements to implement the same function. If a function is described below as implemented using multiple elements, further examples may implement the same function using a single element or a single processing entity. If the terms "include", "including", "comprise" and/or "comprising" are used, they describe the presence of the specified features, integers, steps, operations, processes, elements, components, and/or a group thereof, but do not exclude the presence or addition of one or more other features, integers, steps, operations, processes, elements, components and/or a group thereof. Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of suitable protocols or communication methods.

Figure 1B:
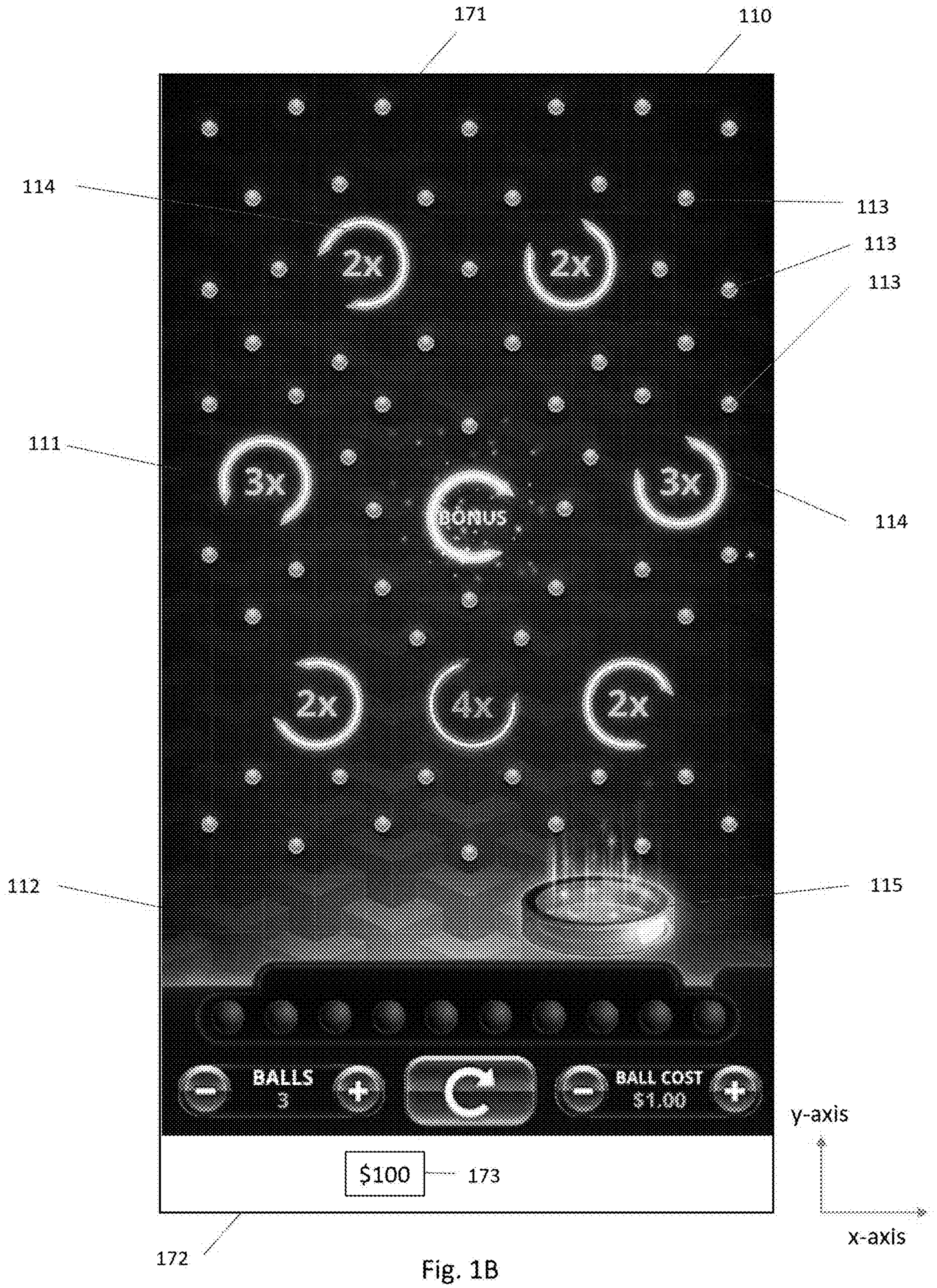

FIGS. 1A to 1B shows a schematic illustration of a gaming device 100 according to various embodiments.

As shown in FIG. 1A, the gaming device 100 may comprise a processor arrangement 104 comprising at least one processor, and a memory arrangement 105 for storing a plurality of instructions, which when executed by the processor arrangement 104, causes the processor arrangement 104 to:

(a) cause display of a gaming environment on a display device, wherein the gaming environment comprises a plurality of obstacles and a plurality of rotating structures in a first region of the gaming environment and a moving structure in a second region of the gaming environment;

(b) receive information related to a wager value and information related to a quantity of objects for play of a game;

(c) cause display of a plurality of objects in the gaming environment, wherein the plurality of obstacles and the plurality of rotating structures influence motion of the plurality of objects in the gaming environment, wherein the plurality of rotating structures are configured for catching and releasing objects in the gaming environment;

(d) cause display of an outcome of the game based on landing outcomes of the plurality of objects with respect to the moving structure.

As shown in FIG. 1B, the gaming environment 110 may be displayed on a display. The display may be a display device such as a display screen or monitor. The environment or the gaming environment 110 referred to in these examples, may include or may refer to the gaming area where the game takes place. The gaming environment 110 may have a two-dimensional layout, which is displayed on a two-dimensional display screen. For example, the gaming environment 110 may have a first horizontal axis (parallel to an x-axis) and a second vertical axis (parallel to a y-axis). In addition, the gaming environment 110 may have a top side 171 (parallel to the x-axis) and a bottom side 172 (parallel to the x-axis).

A gaming environment may be presented in a graphical user interface (GUI). A GUI manages the interaction between a computer system and a user through graphical elements on a display. A GUI may comprise various components such as icons, menus, buttons, and windows that enable users to manipulate and control software. These components may be dynamic and respond to various factors or inputs as explained further below. The GUI operates by receiving user input through devices such as a mouse or touch screen, interpreting the input, and providing visual feedback to the user. Additionally or optionally, elements of the GUI may be activated or controlled by dedicated physical hardware devices such as a button, lever, or knob. For example, a GUI may receive input from a dedicated "play" button that a user presses and the GUI interprets it as input.

During the play of the game, a plurality of objects (e.g. balls) may be introduced into the gaming environment 110 from the top side 171 of the gaming environment 110. The objects may be introduced into the gaming environment 110 in a variety of ways, such as by being thrown, propelled, dropped, injected, or ejected into the gaming environment. The plurality of objects fall (under the influence of gravity) towards the bottom side 172 of the gaming environment 110. The first region 111 of the gaming environment 110 may be a top region of the gaming environment 110. Therefore, objects introduced from the top side 171 enter the first region 111 before entering the second region 112. The second region 112 of the gaming environment 110 may be a bottom region of the gaming environment.

The gaming environment 110 includes a plurality of obstacles 113 and a plurality of rotating structures 114 in the first region 111 of the gaming environment 110. The plurality of obstacles 113 and the plurality of rotating structures 114 may influence the motion of the one or more objects in motion. Influencing the motion may include altering (e.g. changing) at least one of a trajectory, spin, speed, and direction of the one or more objects in motion. For example, an object may be caused to spin or bounce off an obstacle 113 or rotating structure 114 due to contact or collision with the obstacle 113 or the rotating structure 114.

Elements of the gaming environment 110 or of the GUI can be any digital media that is a static or moving image (e.g., rendered 3D object, motion graphics animation, photo image, movie, etc.). An active area, sometimes called a target area, may be a property of an element that allows for interaction with the element. It is the area or field on or around a GUI element (e.g., button, icon, feature) that when touched will cause the GUI element to be activated (e.g., the button/icon is clicked). The active area is sometimes identical to the visual shape of the element as it appears on the screen but is independent of its visual appearance. For example, many irregular-shaped interface elements comprise a rectangular active area that allows for ease of interaction. So, when a user attempts to select an irregular element, they are not required to touch within the visual borders of the element but can, rather, select the element by touching within its larger and more convenient active area. The target or active area is often hidden from the user; however, its presence may be indicated in various ways. For example, an active area may be highlighted as the user's finger approaches the element or screen. Or the active areas may be shown to the user visually, for example, through subtle visual indication or with a brief animation.

The plurality of obstacles 113 may include pegs, pins, blocks, or structures of any shape or size. The motion of the plurality of objects may be influenced based on interactions between the plurality of objects and the plurality of obstacles 113. Each obstacle 113 may influence (or alter) the motion of an object that impacts it. An impact may refer to the object bumping into, falling onto, or being deflected onto the obstacle. An impact on an obstacle 113 by a ball or other object may be visually indicated. It may change its color, brightness, or release a shockwave or other animated effect to denote an impact.

The obstacles 113 (or obstacles) may be positioned at a plurality of positions or locations in or within the gaming environment 110. For example, obstacles 113 may be located at different positions or location coordinates in the first region 111. The positions of these obstacles 113 may be fixed or static, meaning that the obstacles 113 do not move away from the positions where they are located. In some examples, this may mean that in addition to remaining at their respective fixed positions, they do not exhibit any other forms of motion, such as shaking or vibrating at the fixed position. Optionally or alternatively, the obstacles 113 may remain at their respective fixed positions, but still exhibit some forms of motion about the fixed positions, such as shaking or vibrating at their respective fixed positions.

The plurality of rotating structures 114 may be positioned at respective locations in the first region 111 of the gaming environment 110. For example, each rotating structure 114 may be associated with a different respective position or location in or within the gaming environment 110. Additionally, a (or each) respective rotating structure 114 may rotate (or spin) around its respective position or location coordinate (x, y). In one time period (T), a rotating structure 114 may complete a 360° rotation around an axis of rotation. The axis of rotation may be an imaginary straight line that passes through the location coordinate and out of the display. Additionally, the axis of rotation may be located along or parallel to a z-direction (perpendicular to the x- and y-axis).

Compared to the plurality of obstacles 113, the plurality of rotating structures 114 are able to receive and release objects. In this way, the plurality of rotating structures 114 alter the path of any objects that interact with or impact them. In addition, the plurality of rotating structures 114 may be able to influence (or alter) the motion of any object that bumps into, falls onto, or is deflected onto the obstacle 113. A rotating structure 114 may be configured for catching (or receiving) one or more objects, and for releasing the one or more objects. For example, a (or each) respective rotating structure 114 may include a receptacular or bowl-like structure for catching one or more objects of the plurality of objects. The term receptacular generally denotes relating to or constituting a receptacle, which is a container or structure that holds or contains something. For example, the receptacular structure may include features or structures that impede, delay, or prevent the object from exiting the receptacular structure.

A rotating structure 114 may have an opening or mouth for receiving at least one object. Receiving the object may include or may refer to catching the at least one object. Additionally, a rotating structure 114 may include (or may have) a holding area or volume for holding an object caught or received via the opening of the rotating structure 114. The rotation of the rotating structure 114 may cause a received object to be released after a holding time. The holding time may be an amount of time that depends on the speed or rate of rotation of the rotating structure 114. The rotation of the rotating structure 114 may cause the opening of the rotating structure 114 to be positioned in a way that the object exits (e.g. falls out of) the rotating structure 114. The holding area of the rotating structure 114 may hold one or more objects concurrently.

The gaming environment 100 further comprises a moving structure 115 in the second region 112 of the gaming environment 110. The second region 112 of the gaming environment may be located adjacent to the first region 111. In addition, the first region 111 and the second region 112 may be connected seamlessly with each other, without any demarcations between them. The second region 112 may be a region in the gaming environment 110 that is substantially free from the plurality of obstacles 113, which allows the moving structure 115 to move (or travel) unimpeded between two different points within the gaming environment 110. Put in another way, the second region 112 may be a region in the gaming environment 110 which allows free lateral movement of the moving structure 115. The movement of the moving structure 115 in the second region may be translational movement, e.g. along one lateral axis (e.g. the x-axis). The moving structure 115 may travel back and forth between a first position of the second region 112 and a second position of the second region 112 of the gaming environment 110.

The moving structure 115 may include or may be a receptacular or bowl-like structure for receiving and/or catching at least one object of the one or more objects. The moving structure 115 may have an opening for catching at least one object. The opening of the moving structure 115 may face the first region 111 in order to catch objects traveling from the first region 111 to the second region 112.

The gaming environment 110 as described in FIG. 1B may be shown on a display to a user. The plurality of rotating structures 114 may be in a state of continual rotational motion. Additionally, the moving structure 115 may be in a state of continual translational motion.

Play of the game may be initiated based on a user input at the user input interface. For example, the player may cause payment of a credit which is added to a credit meter. The processor arrangement may include credit control circuitry which controls a credit meter based on the amount of credit received by a credit input interface. As an example, the initial credit added to the credit meter may be $100, which is displayed on the credit meter as shown in FIG. 1B.

The play of one round of a game may include the initiation of play by the user (e.g. triggering a play button), an entry of a plurality of balls into the gaming environment, and a landing outcome of the plurality of balls with respect to the moving structure 115. A game outcome is the result of the play of one round of a game.

Figure 2A:
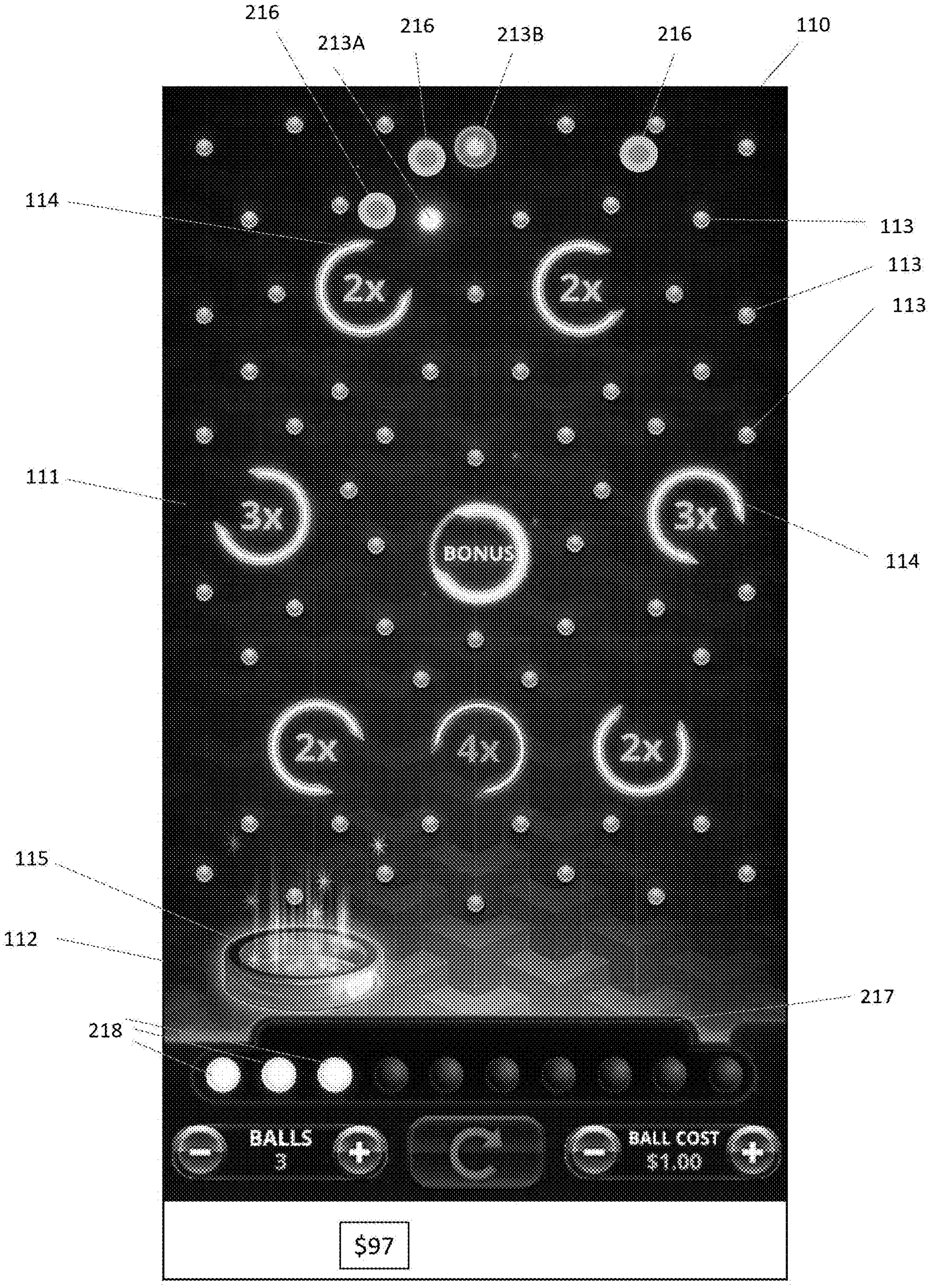
FIGS. 2A and 2B show schematic illustrations of examples of play of a game executed by a gaming device according to various embodiments.
Figure 2B:
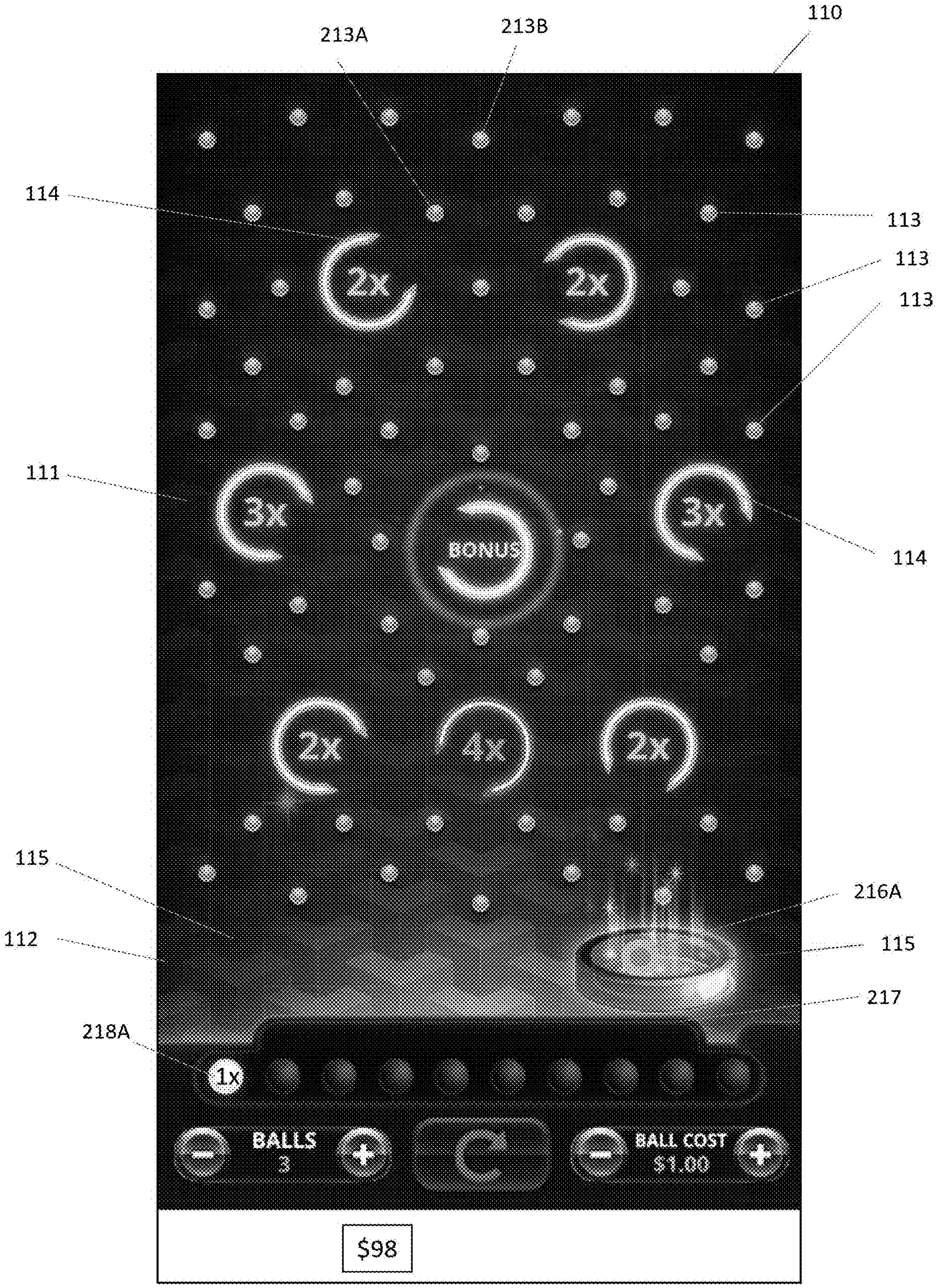

FIGS. 2A and 2B show schematic illustrations of examples of play of a game executed by the gaming device 100 already described in connection with FIGS. 1A to 1B.

After receiving payment of a credit, the processor arrangement may cause a user input device to allow some input values to be input by the user. The user may select a quantity of objects for the play of the game. The one or more objects may include a plurality of balls. The user may select the number of balls for the play of the game. The number of balls selected by the user may be at least one. Alternatively or optionally, the user may be given the option to select a number of balls, which may range from 3 up to and including 5 balls. The user may also select a wager value. The wager value may be the cost of each ball. As shown in FIG. 2A, the user has selected "3" balls. The user has also selected the wager value (or cost of each ball) to be $1.00.

The processor arrangement 104 may receive information related to a wager value and information related to a quantity of objects for play of a game. The processor arrangement 104 may receive, via interface control circuitry, the information related to a quantity of objects for the play of the game (e.g. 3 balls), and the information related to a wager value representing a cost of an object of the one or more objects ($1 for each ball). In addition, the credit control circuitry updates the credit meter so that the total wager value is deducted from the initial credit balance ($100). The total wager value is the wager value (e.g. "$1.00") multiplied by the quantity of objects (e.g. "3"). In this example, the total wager value of $3.00 is deducted from the initial credit balance of $100. The updated credit balance is shown to be "$97".

The processor arrangement 104 may cause the user input device to allow the player to initiate the start of play. For example, the start of play may be initiated by activating a "play" button. (e.g. by pressing or tapping the play button, for instance). Optionally, the "play" button may be present in the GUI. Alternatively, the "play" button may be a physical button or knob. The player's input may generate a signal initiating play of the game. The processor arrangement 104, in response to receiving the signal initiating play of the game, causes the play of the game by causing the display of the entry of a plurality of objects 216 into the gaming environment 110. The number of objects 216 is equal to the quantity of objects selected by the user.

The plurality of objects 216 may include (or may be) a plurality of balls falling through the gaming environment 110 from the first region 111 towards the second region 112. The balls 216 may enter the gaming environment from the top of the gaming environment 110 and fall towards the bottom of the gaming environment 110 under the force of gravity. The balls 216 may enter the gaming environment at different projection angles or at different trajectories from each other. As the balls pass through the first region 111, their path and/or motion is altered when meeting the plurality of obstacles 113 and a plurality of rotating structures 114.

The processor arrangement 104 is configured to cause display of a scoreboard in the gaming environment 110. The scoreboard 217 may display gaming information to the user. For example, the scoreboard 217 may show a number of representative balls. The number of representative balls may be equal to the quantity of balls selected by the user. For example, the player may have chosen "three" as the quantity of balls for the gameplay. As the three balls 216 enter the gaming environment, three representative balls 218 in the scoreboard are illuminated to indicate that three balls are in play in the gaming environment 110.

As the balls 216 fall from the top side of the gaming environment 110 towards the bottom side of the gaming environment 110, they encounter the plurality of obstacles 113 and the plurality of rotating structures 114 located in the first region 111. If a ball 216 meets with any of the obstacles 113, the obstacles 113 may show detectable changes. The changes may be a visible change, such as by being lit up or illuminated. Additionally or alternatively, the changes may be auditive, such as being in the form of sounds being generated. Obstacles 213A and 213B are examples of obstacles showing visible changes after being impacted by a ball 216.

As the balls 216 exit the first region 111 and enter the second region 112, each ball 216 will have (or arrive at) a landing outcome in the second region. A landing outcome of an object may include landing outside of the moving structure 115 or being caught by the moving structure 115. For example, an object may either land outside the moving structure 115 or land into the moving structure 115.

FIG. 2B shows an example that illustrates the behavior and outcome of one of the three balls 216 in one round of the play of the game. In this example of a round, a single ball 216A falls through the first region. On its way, it may meet a plurality of obstacles 113 but does not land in a rotating structure 114. Eventually, the ball lands in the moving structure 115 in the second region. The other two balls 216 did not land any of the plurality of rotating structures 114 either. The other two balls 216 do not land in the moving structure 115 and exit the second region 112 and gaming environment 110.

The scoreboard 117 may display an indication of the landing outcome of each ball 216. For example, as shown in FIG. 2B, the scoreboard shows that one ball (e.g. a first ball 216A) has been caught by the moving structure 115 (e.g. one illuminated ball remains). The scoreboard further shows an object multiplier value. An object multiplier value may represent accumulated multiplier values associated with the outcomes of an object—in this case, the first ball 216A. Each respective object may have a respective associated object multiplier value depending on its path in the game.

For example, Since the first ball 216A did not land in any of the rotating structures 114, it does not accumulate the multiplier values associated with the rotating structures 114. Each rotating structure 114 of the plurality of rotating structures is associated with a respective multiplier value (e.g. 2×, 3×, 4×). Since the first ball 216A lands in the moving structure 115, it accumulates the multiplier value associated with the moving structure 115. In this example, the multiplier value associated with moving structure 115 is 1× (e.g. one times). The object multiplier value for that object, ball 216A, is thus 1×. Therefore, "1×" is displayed on the first representative ball 218A. The "1×" indicates that the wager value of $1.00 will be multiplied by one, (e.g. one times the wager value is 1×$1.00). The other two have neither been caught by a rotating structure 114 nor a moving structure 115. Therefore, the respective object multiplier values are 0× and 0×.

It can be understood that the game outcome is related to the respective landing outcomes of the one or more objects 216 in the second region 112. For example, the game outcome is based on the landing of one or more objects 215 inside or outside of the moving structure 115. In addition, the game outcome may be based on a summation of the object multiplier values of the plurality of balls 216. In this example, the total object multiplier value may be 1×+0×+0×=1×. The game outcome may be the total object multiplier value multiplied by the wager value. In this example, this would be 1×$1.00=$1.00.

The processor arrangement 104 further causes display of the game outcome. The credit control circuitry may update the credit meter so that the credit value of $1.00 is added to the current credit balance of "$97". This results in an updated credit balance of "$98". The processor arrangement 104 causes the display to display the game outcome, which is "$98", or a gain of $1.00.

Figure 3A:
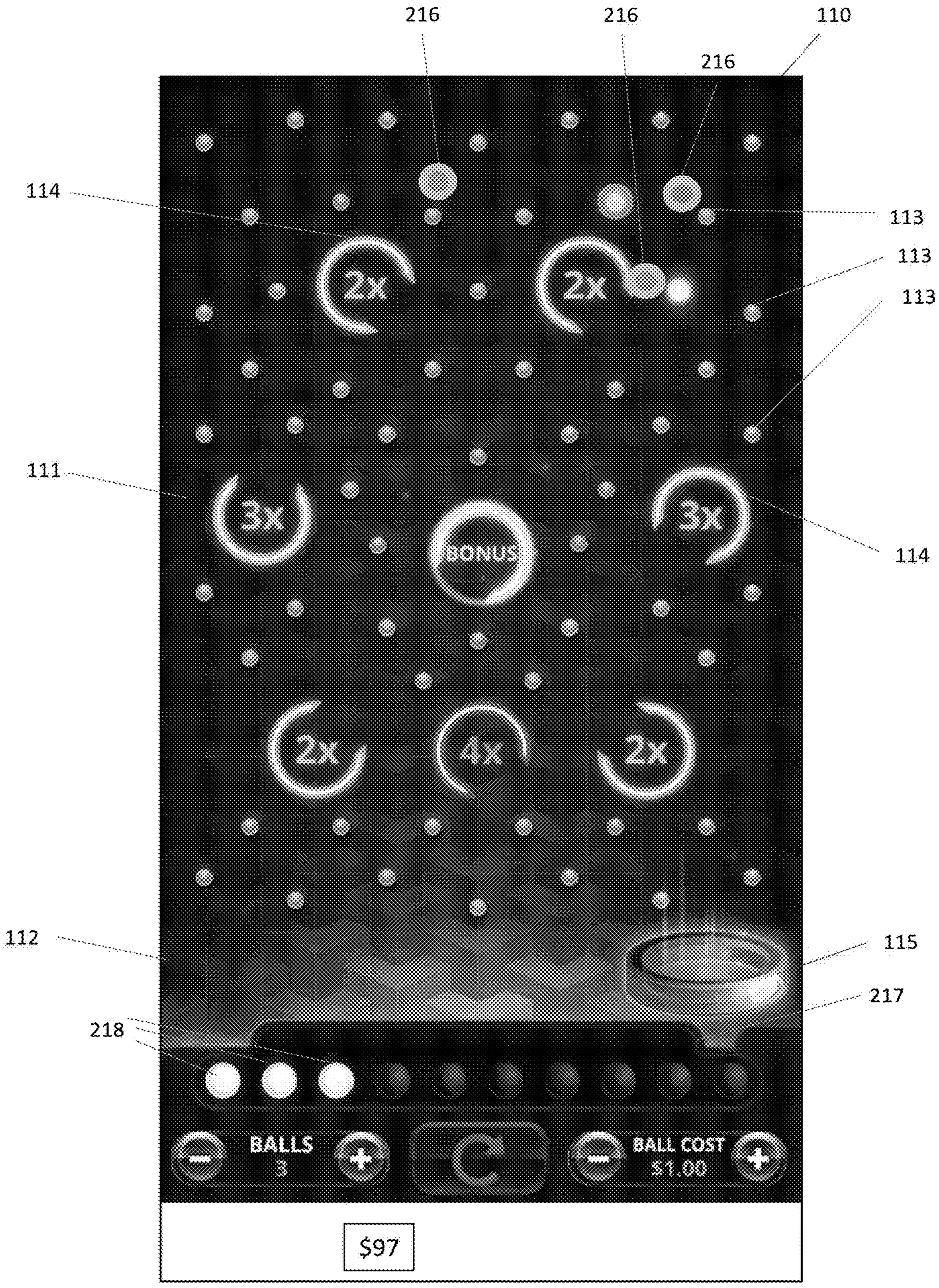
FIGS. 3A to 3C show schematic illustrations of further examples of play of a game executed by the gaming device according to various embodiments.
Figure 3B:
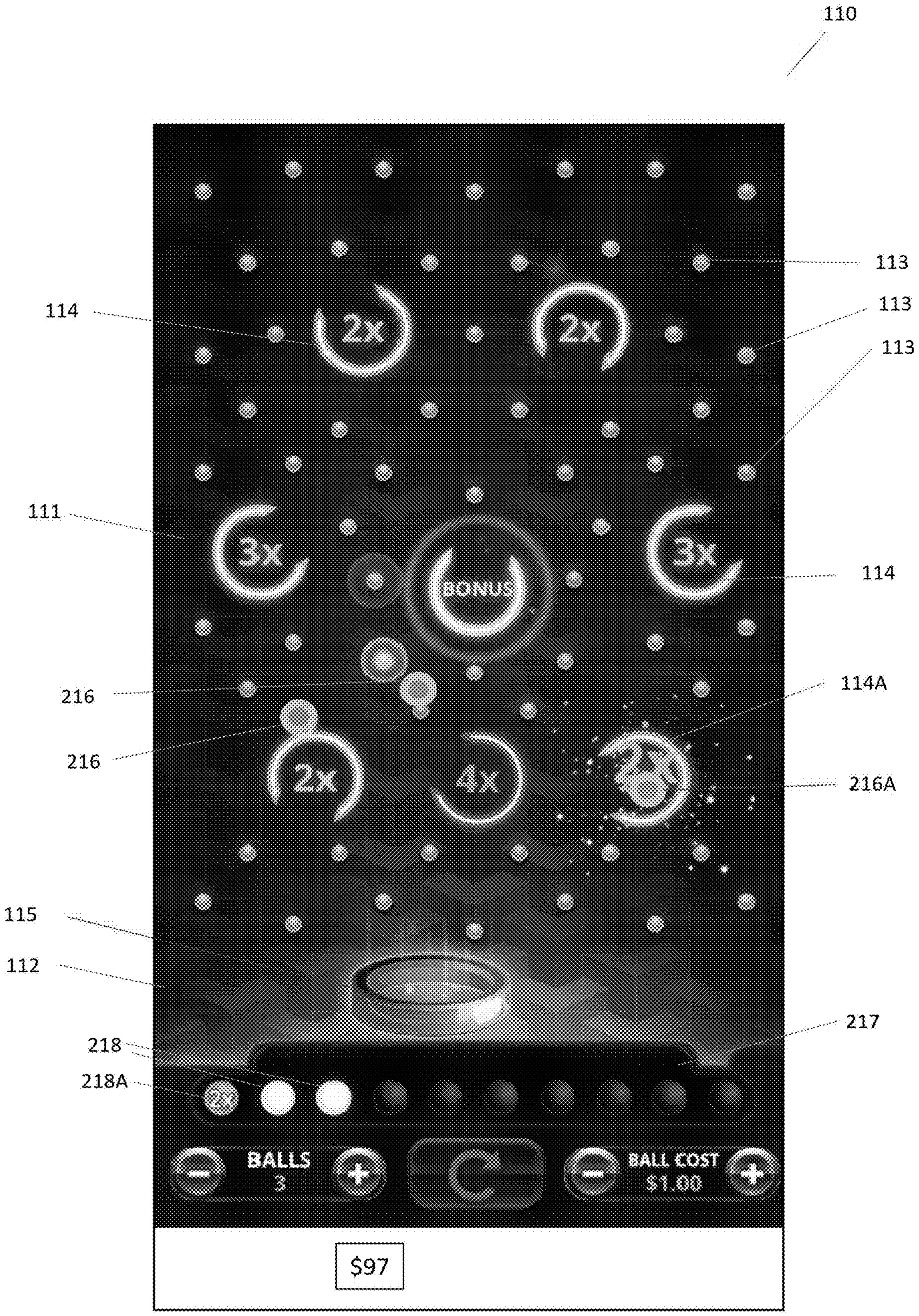
Figure 3C:
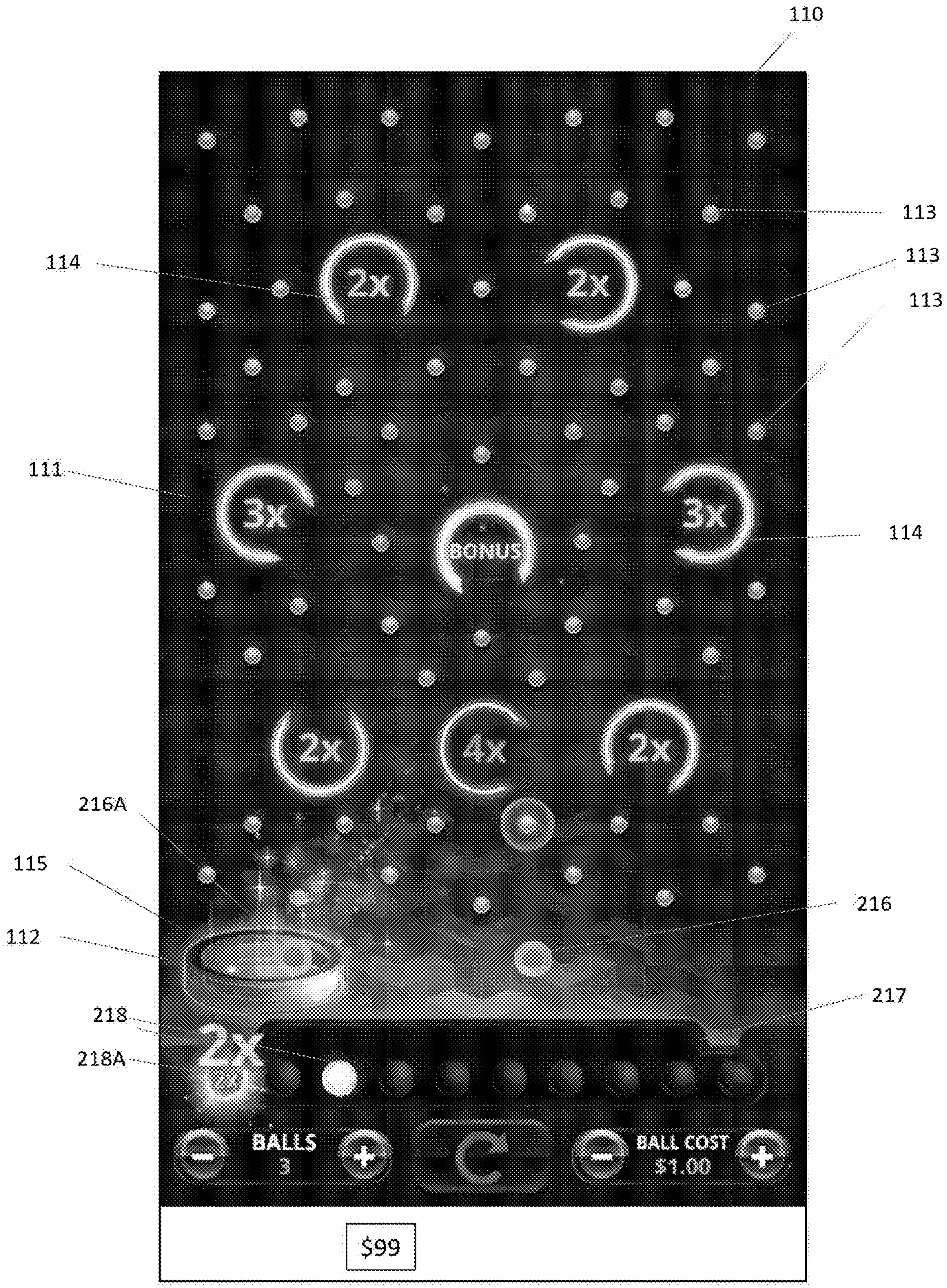

FIGS. 3A to 3C show schematic illustrations of further examples of play of a game executed by the gaming device 100 already described in connection with FIGS. 1A to 2B.

FIG. 3A shows an example wherein play of the game may be initiated based on a user input at the user input interface. As already described in FIG. 2A, the user has selected "3" balls. The user has also selected the wager value (or cost of each ball) to be $1.00. The total wager value of $3.00 is deducted from the initial credit balance of $100, and the updated credit balance is shown to be "$97".

The initiation to start play has triggered the entry of three balls 216 into the gaming environment 110. As shown in FIGS. 1B to 3C, each rotating structure 114 of the plurality of rotating structures is associated with a respective multiplier value (e.g. 2×, 3×, 4×). A game outcome may be based on the respective multiplier value associated with a rotating structure 114 identified to have caught at least one object.

As shown in FIG. 3B one of the balls (or objects) 216A, is caught by a rotating structure 114 of the plurality of rotating structures 114 with the respective multiplier value "2×".

The catch may be represented on the scoreboard 217. For example, of the three representative balls 218 on the scoreboard 217, the scoreboard may show a potential object multiplier value "2×" on one illuminated representative ball 218A to indicate that one ball 216A was caught by the rotating structure 114 associated with the multiplier value “2×”. Since the other two balls 216 have not been caught by any rotating structure 114, no potential object multiplier value is displayed on the other two illuminated representative balls 218. In this example, the other two balls 216 may exit the second region. When balls exit the second region, their respective representative balls on the scoreboard may return to an unilluminated state.

Optionally or additionally, the catch may also be represented by altering one or more visual indications or properties of the object 216A that was caught by the rotating structure 114A. The properties of object 216A may include a color, shape, size, trail, hue, brightness, and the display of text or icons. For example, when ball 216A is caught by rotating structure 114 the ball may change to the color of the rotating structure to denote that it now is associated with the object multiplier value “2×”. The ball 216A may also gain a trail, such as a particle trail, indicating the path it traveled. The trail may be of the same or similar color as its object multiplier value color and denote all or a portion of the path the ball has taken as it continues its progression through the environment 110.

Each rotating structure may have a visual property, such as a color, associated with its value, and that property may be imparted on any objects caught by the structure to denote their changed value. Optionally the visual properties of objects and structures may be aligned so that common values are represented by similar or identical properties, such as color. Another example is that the value of each rotating structure 114 may be written on or added to the object 216A as it is caught. This value can be denoted in text or as an icon. The ball 216A may, when caught by a first structure 114 denote that it is worth “2×” and, when caught by a second structure 114 worth “3×”, change its value to “5×” to show the summation of 3× and 2× (3×+2×).

In order for the potential object multiplier values to be realized into actual credit won by the player, the ball 216A has to be caught by the moving structure 115. For example, if a ball 216 is caught by a rotating structure 114 but not caught subsequently by the moving structure 115, the potential object multiplier value associated with the rotating structure 114 does not become an object multiplier value. Therefore, an associated credit is not credited to the player’s credit balance.

As shown in FIG. 3C, after the first ball 216A is caught by the rotating structure 114, it proceeds to land in the moving structure 115. This means that the potential object multiplier value (2×) associated with the rotating structure 114 that caught the first ball 216A, is realized as the object multiplier value. The processor arrangement may be configured to display graphics on the illuminated representative ball 218A to indicate that the ball 216A was caught by the rotating structure 114A and the moving structure 115. Optionally, the graphics may include sparkles, lights, or an enlargement of the indicator “2×”, for example. The value “2×” on the moving structure 115 shows the object multiplier value associated with the ball 216A.

Each object may have its own respective objective multiplier value based on the catching outcomes of the object in the plurality of rotating structures 114 and the landing outcome of the object in the moving structure 115. For example, since the first ball 216A proceeded to be caught by the moving structure 115, the object multiplier value associated with the first ball 216A was “2×”. The second ball was neither caught by a rotating structure 114 nor did it land on the moving structure 115. The object multiplier value of the second ball 216B is 0×. The third ball 216C was neither caught by a rotating structure 114 nor did it land on the moving structure 115. The object multiplier value of the third ball 216C is 0×.

The game outcome may be the credit value which is to be a credit to the credit balance at the end of the game of play. A credit value is credited to the player’s credit balance only if at least one object 216 is caught by the moving structure 115. The credit value information may be based on the summation of object multiplier values of each object caught by the moving structure, multiplied by a wager value. In this example, the total object multiplier value may be 2×+0×+0×=2×. The game outcome may be the total object multiplier value multiplied by the wager value. In this example, this would be 2×$1.00=$2.00. Therefore, the credit value of $2.00 (2×$1.00=$2.00) is to be credited to the user. The processor arrangement 104 causes an update of the credit meter based on the game outcome. Therefore, the credit balance is updated to “$99”.

FIGS. 4A to 4D show schematic illustrations of examples of play of a game executed by the gaming device 100 already described in connection with FIGS. 1A to 3C.

Figure 4A:
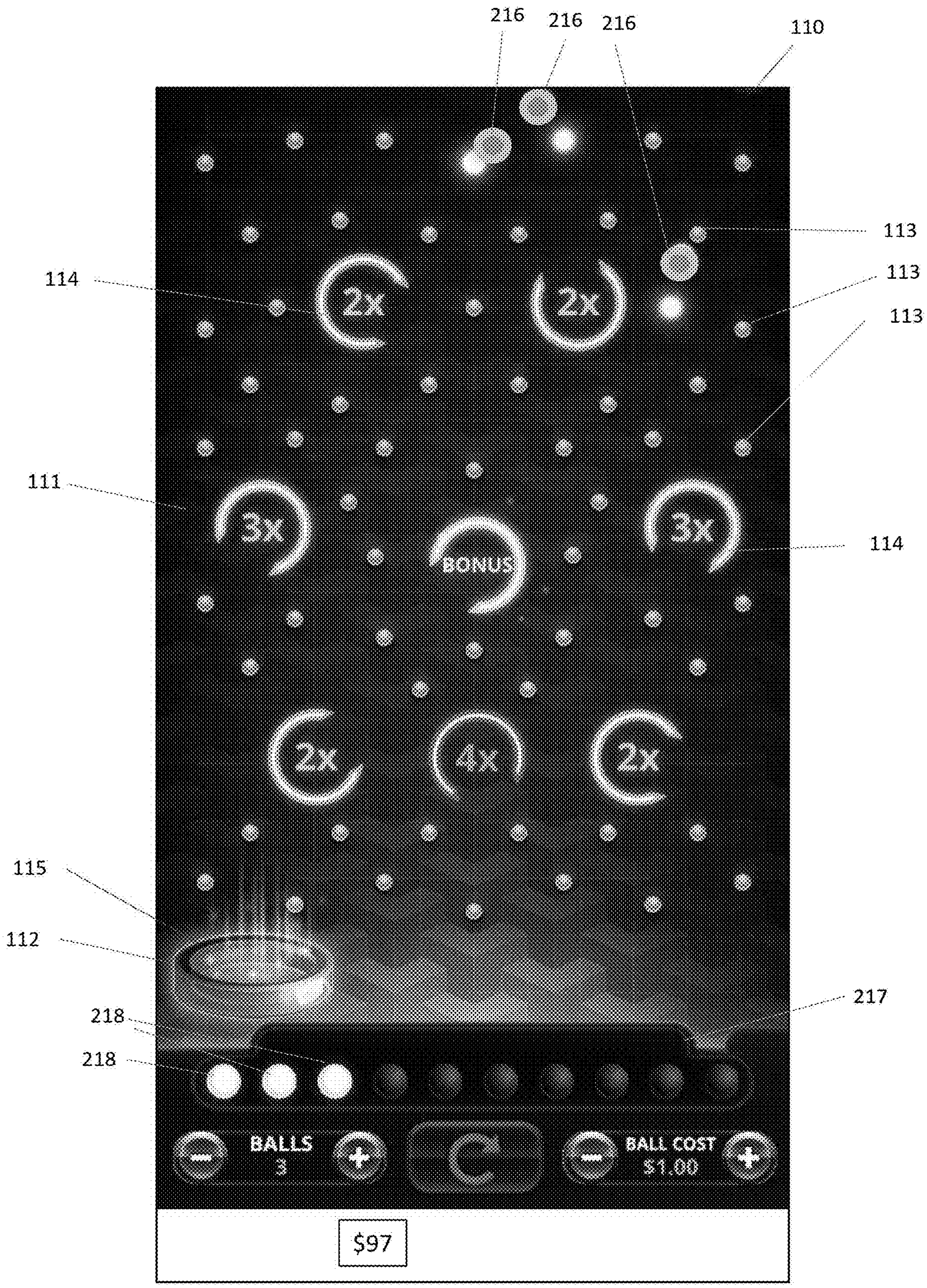
FIGS. 4A to 4D show schematic illustrations of further examples of play of a game executed by the gaming device according to various embodiments.

FIG. 4A shows an example wherein play of the game may be initiated based on a user input at the user input interface. As already described in FIGS. 2A and 3A, the user has selected “3” balls. The user has also selected the wager value (or cost of each ball) to be $1.00. The total wager value of $3.00 is deducted from the initial credit balance of $100, and the updated credit balance is shown to be “$97”. As shown in FIG. 4A, three balls, 216 are in play. Therefore, three representative balls 218 are illuminated on the scoreboard 217.

Figure 4B:
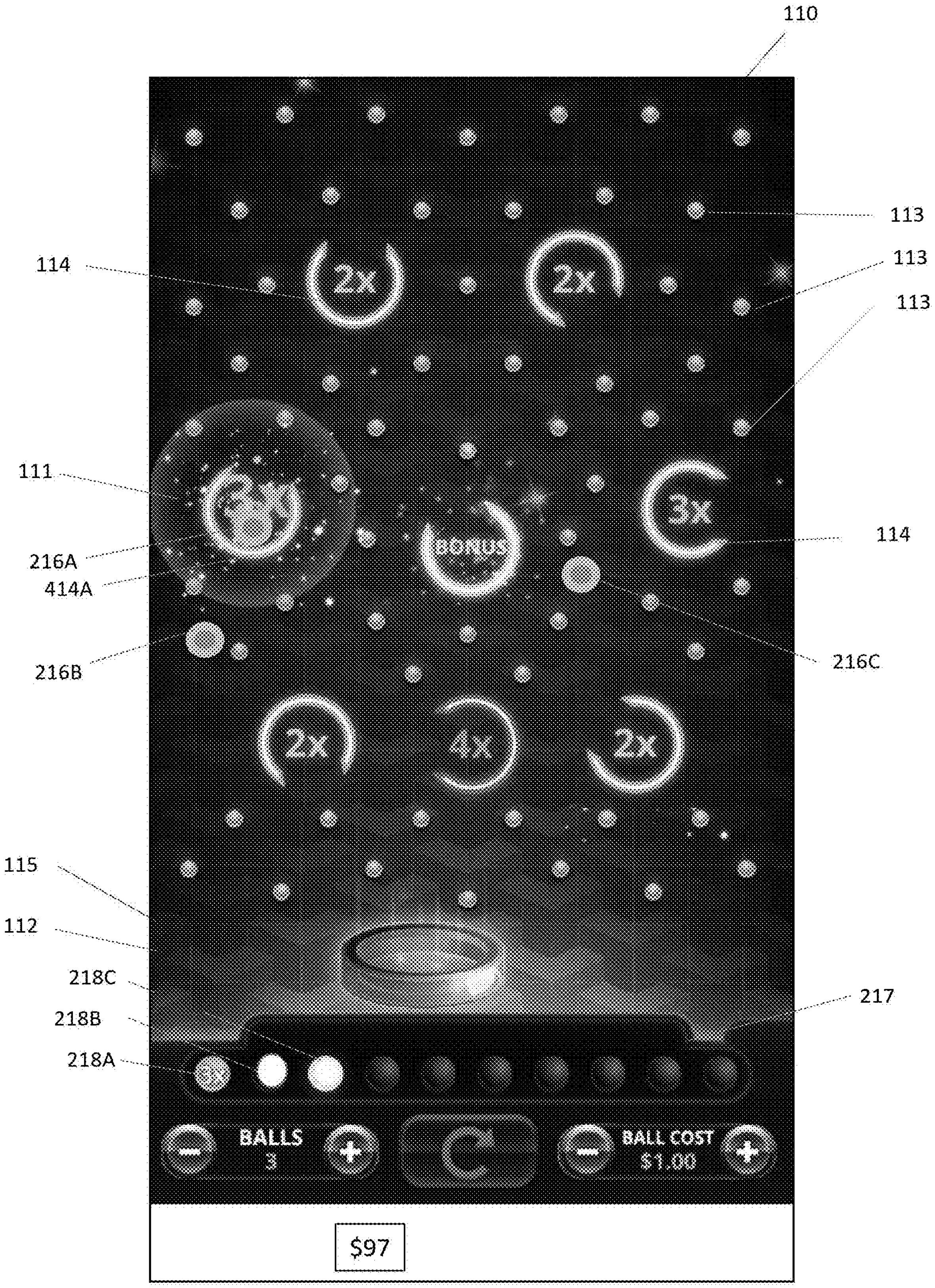

As shown in FIG. 4B one of the balls (or objects) 216, has been caught by a rotating structure 414A of the plurality of rotating structures 114 with the respective multiplier value “3×”. The catch may be represented on the scoreboard 217. For example, of the three representative balls 218A on the scoreboard 217, the scoreboard may show the potential object multiplier value “3×” on one illuminated representative ball 218A to indicate that one ball 216A was caught by the rotating structure 414A associated with the multiplier value “3×”. A second representative ball 218B and a third representative ball 218C may remain illuminated to indicate that a second ball 216B and a third ball 218C are still in play respectively. However, since the second ball 216B and the third ball 218C have not been caught by a rotating structure 114, they do not accumulate a potential object multiplier value.

Figure 4C:
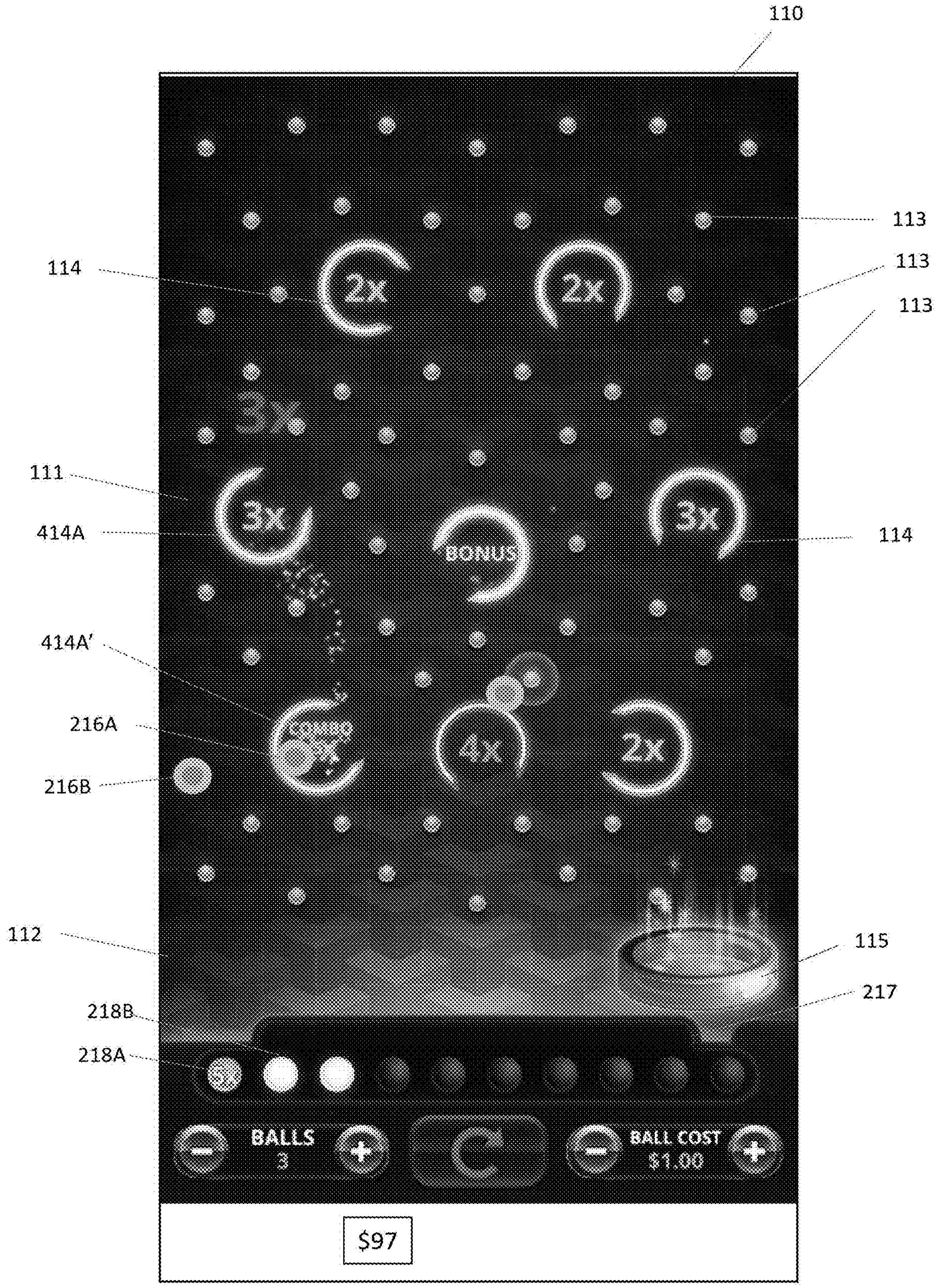

As shown in FIG. 4C, after being caught by a rotating structure 414A, the first ball 216A may be caught by a further rotating structure 414A'. The processor arrangement 104 may display the potential object multiplier value to be earned if the first ball 216A proceeds to be caught by the moving structure 115. In this example, the rotating structures that caught the first ball 216A were rotating structures 414A and 414A'. The processor arrangement 104 may display a potential object multiplier value on the first representative ball 218A on the scoreboard 217. The potential object multiplier value may be a summation of the respective multiplier values associated with the rotating structures 414A, 414A' that caught the first ball 216A. The processor arrangement 104 shows the summation of 3× and 2×(3×+2×) to obtain “5×”. The illuminated representative ball 218A on the scoreboard may display the graphics “5×” representing the potential object multiplier value that could be won if the first ball 216A lands in the moving structure 115.

Optionally or additionally, the further catch by rotating structure 414A' may also be represented by altering one or more properties of the object 216A that was previously caught by structure 414A. Object 216A may visually indicate its new, combined "5×" object multiplier value by adopting a third color independent of the colors of 414A and 414A'. Separate colors may be assigned for each value of the rotating structures 114 as well as all possible combined values to indicate to a user the new worth of the falling balls as they fall down the board.

Figure 4D:
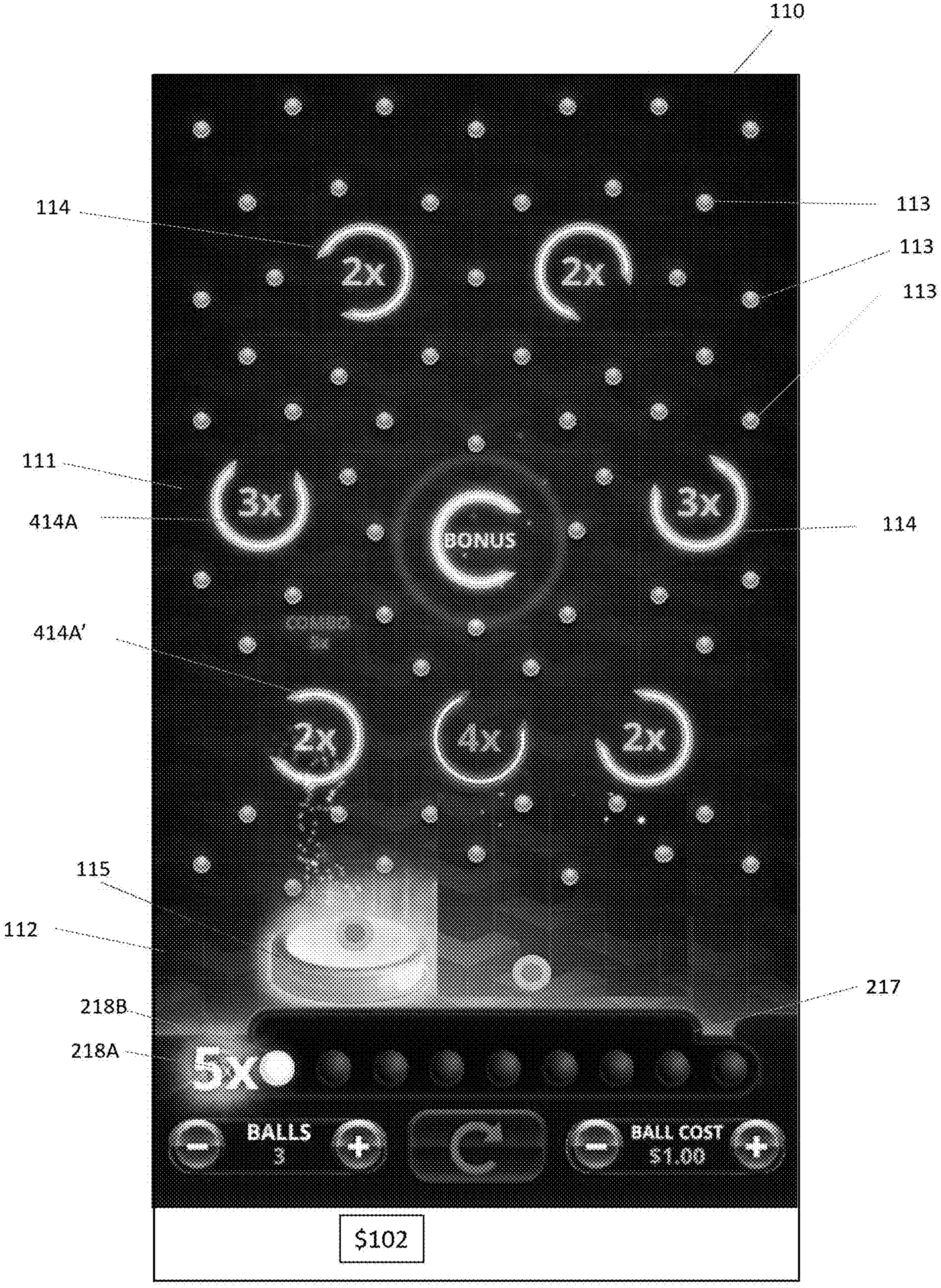

As shown in FIG. 4D, the first ball 216A proceeds to be caught by the moving structure 115.

This means that the potential object multiplier values (2×+3×=5×) associated with the rotating structure 114 that caught the first ball 216A, are realized as the object multiplier value. The processor arrangement may be configured to display graphics on the illuminated representative ball 218A to indicate that the ball 216A was caught by the rotating structure 114A and the moving structure 115. For example, the illuminated representative ball 218A may be further illuminated with graphics to indicate that the ball 216A was caught by the rotating structures 414A, 414A' and the moving structure 115. Optionally, the further illumination may include sparkles, lights, or an enlargement of the indicator "5×", for example. The game outcome may be based on an object multiplier value associated with each respective object of the plurality of objects. The object multiplier value may be based on catching outcomes of the object by the plurality of rotating structures 114 and the landing outcome of the object in the moving structure 115. For example, in the case of the first ball 216A, the object multiplier value is "5×". The object multiplier value may be based on a summation of the multiplier values of one or more rotating structures catching the object 216A.

In this example, the total object multiplier value may be 5×+0×+0×=5×. The game outcome may be the total object multiplier value multiplied by the wager value. In this example, this would be 5×$1.00=$5.00. Therefore, the credit value of $5.00. The processor arrangement 104 causes an update of the credit meter based on the game outcome. Therefore, the credit balance is updated to "$102".

Figure 5A:
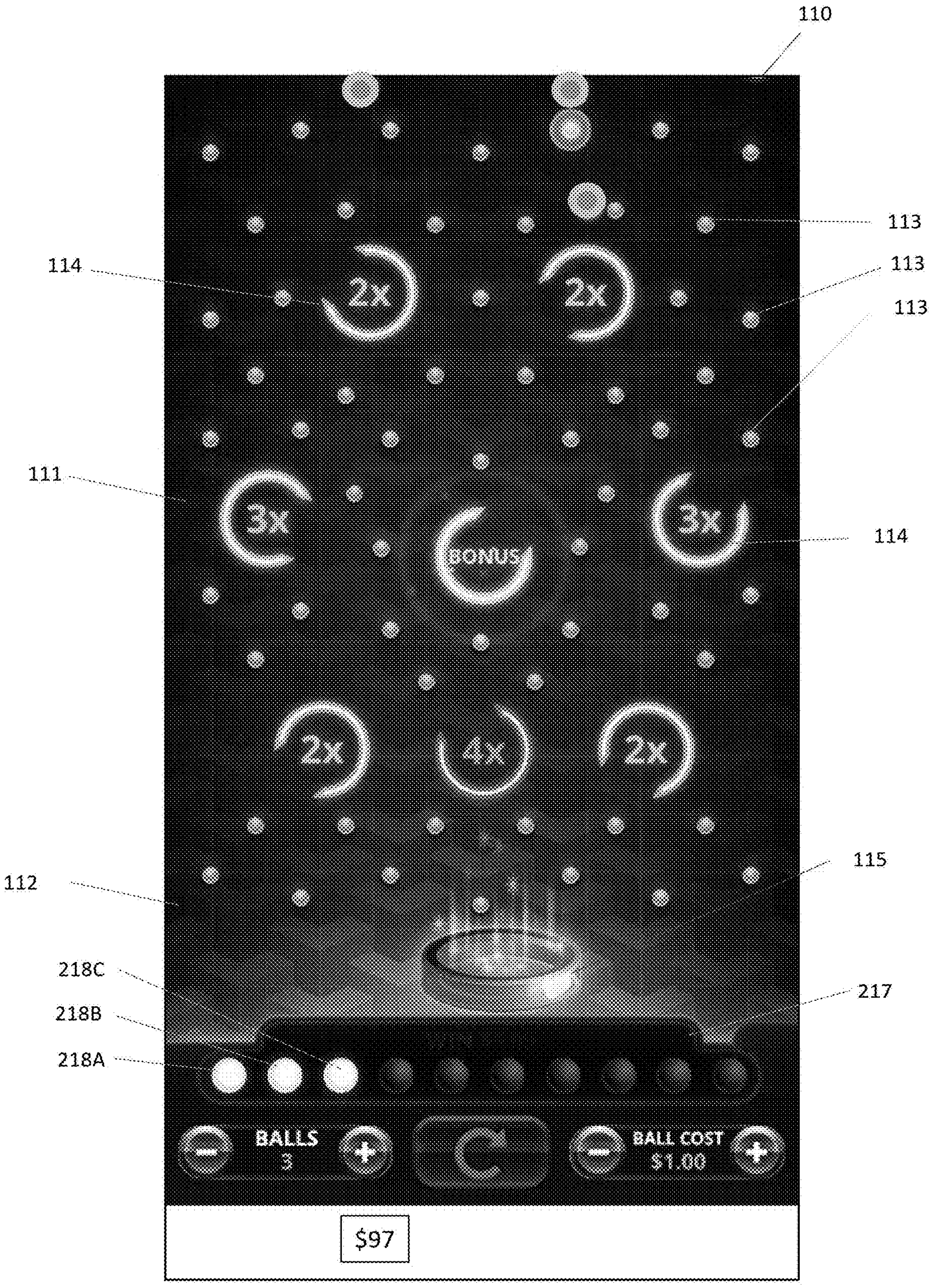
FIGS. 5A to 5C show schematic illustrations of further examples of play of a game executed by the gaming device according to various embodiments.
Figure 5B:
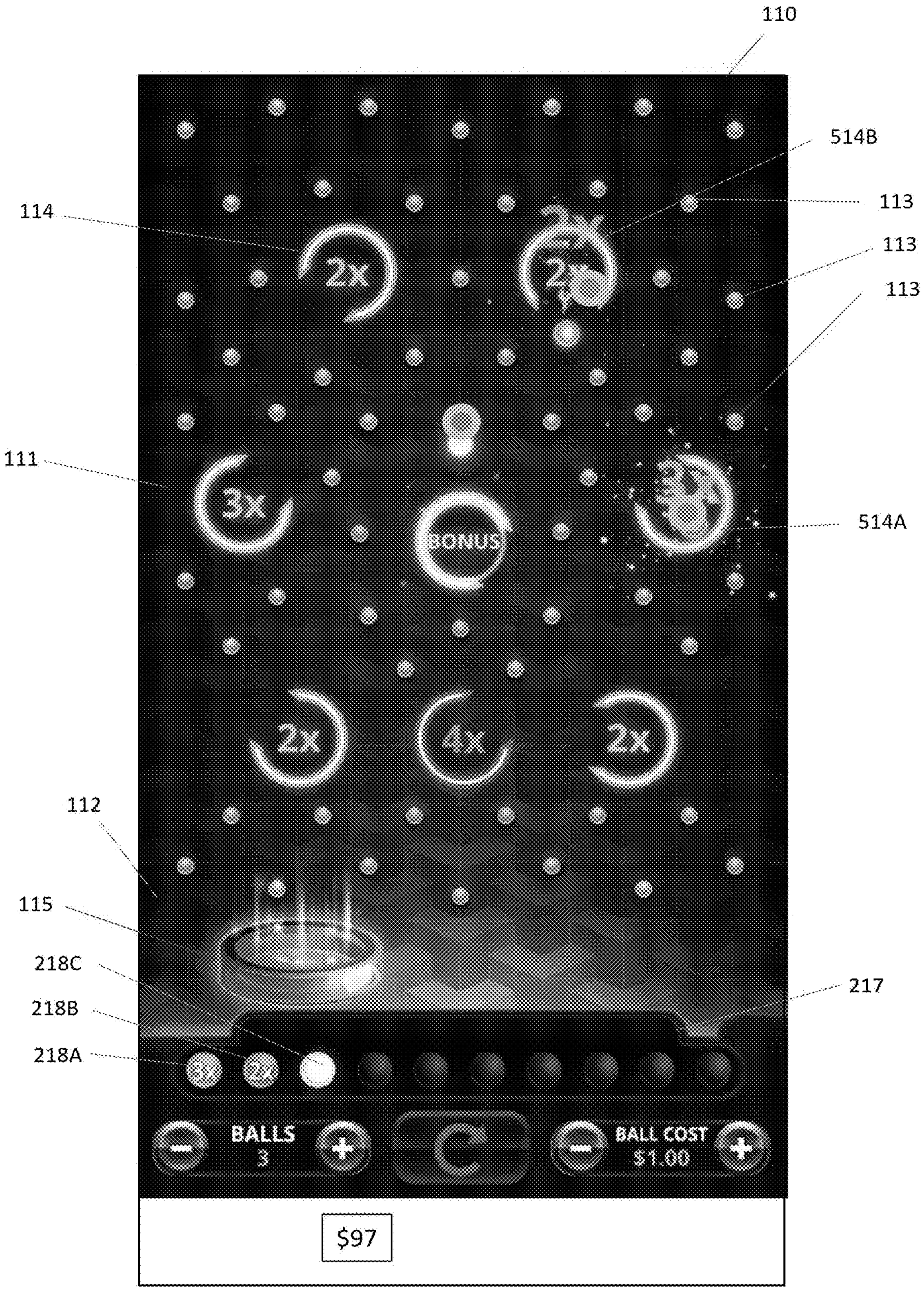
Figure 5C:
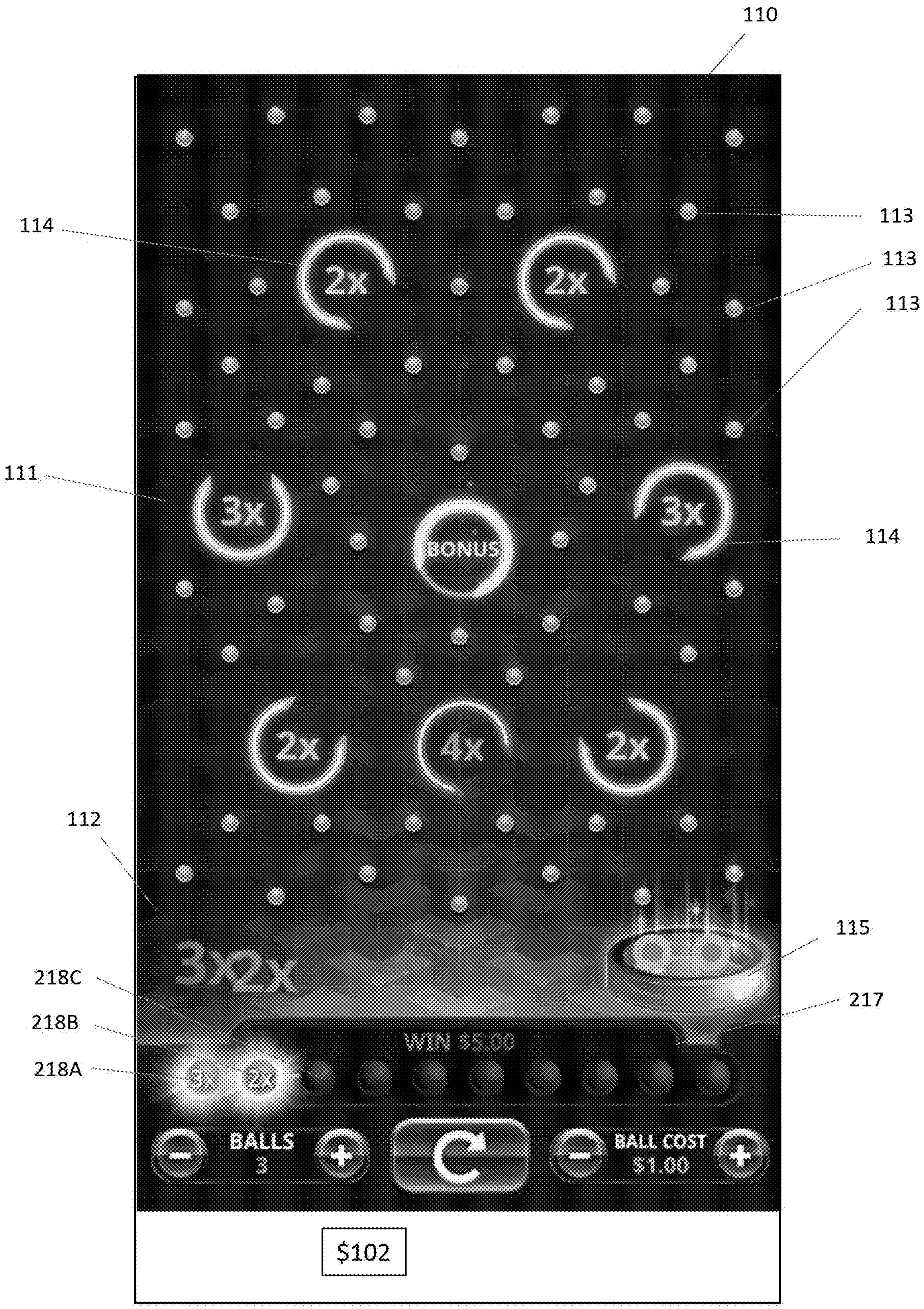

FIGS. 5A to 5C show schematic illustrations of play of a game executed by the gaming device 100. already described in connection with FIGS. 1A to 4D.

FIG. 5A shows an example wherein play of the game may be initiated based on a user input at the user input interface. Similarly to the example described in FIGS. 2A and 3A, the user has selected "3" balls. The user has also selected the wager value (or cost of each ball) to be $1.00. The total wager value of $3.00 is deducted from the initial credit balance of $100, and the updated credit balance is shown to be "$97". When the user presses "play", three balls enter the gaming environment 110. This entry into the gaming environment 110 is represented on the scoreboard 217 by the illumination of three representative balls representing the three balls in the gaming environment 110.

As shown in FIG. 5B, a first ball 216A, has been caught by a rotating structure 514A of the plurality of rotating structures 114 with the respective multiplier value "3×". Additionally, a second ball 216B, has been caught by a rotating structure 514B of the plurality of rotating structures 114 with the respective multiplier value "2×".

The catches may be represented on the scoreboard 217. For example, the scoreboard may show the potential object multiplier value "3×" associated with the first ball 216A on the first illuminated representative ball 218A to indicate that the first ball 216A was caught by the rotating structure 514A associated with the multiplier value "3×. Additionally, the scoreboard may show the potential object multiplier value "2×" associated with the second ball 216B on the second illuminated representative ball 218B to indicate that the second ball 216B was caught by a moving structure 514B.

As shown in FIG. 5C, the first ball 216A and the second ball 216B proceed to be caught by the moving structure 115. The third ball 216C exits the second region without having been caught by the second movable structure 115.

The total object multiplier value is 3× (ball 216A)+2× (ball 216*b*)+0× (ball 216*c*)=5×.

The game outcome may be the total object multiplier value multiplied by the wager value. In this example, this would be 5× $1.00=$5.00. Therefore, the credit value of $5.00. The processor arrangement 104 causes an update of the credit meter based on the game outcome. Therefore, the credit balance is updated to "$102".

Figure 6A:
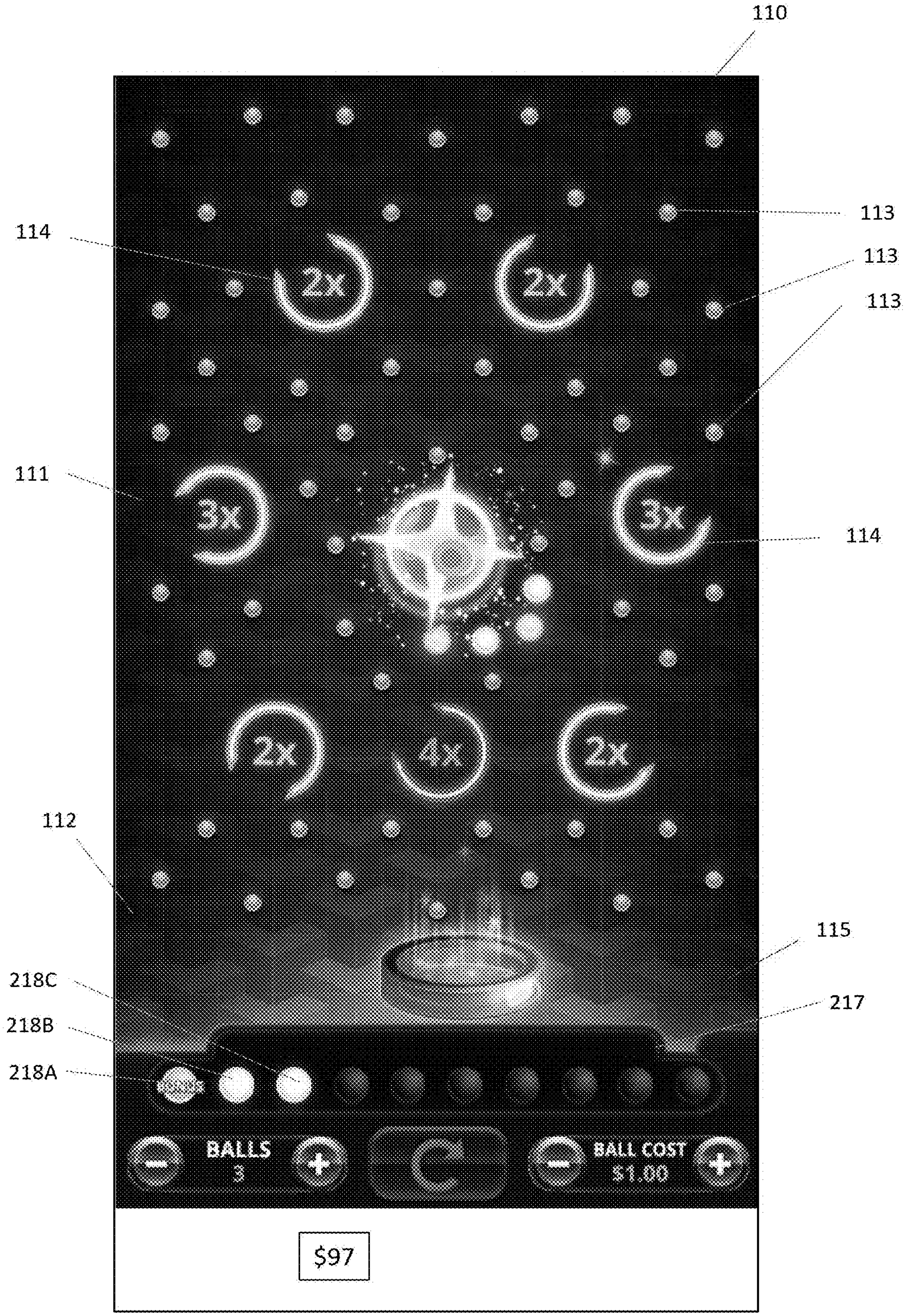
FIGS. 6A and 6B show schematic illustrations of further examples of play of a game executed by the gaming device according to various embodiments.
Figure 6B:
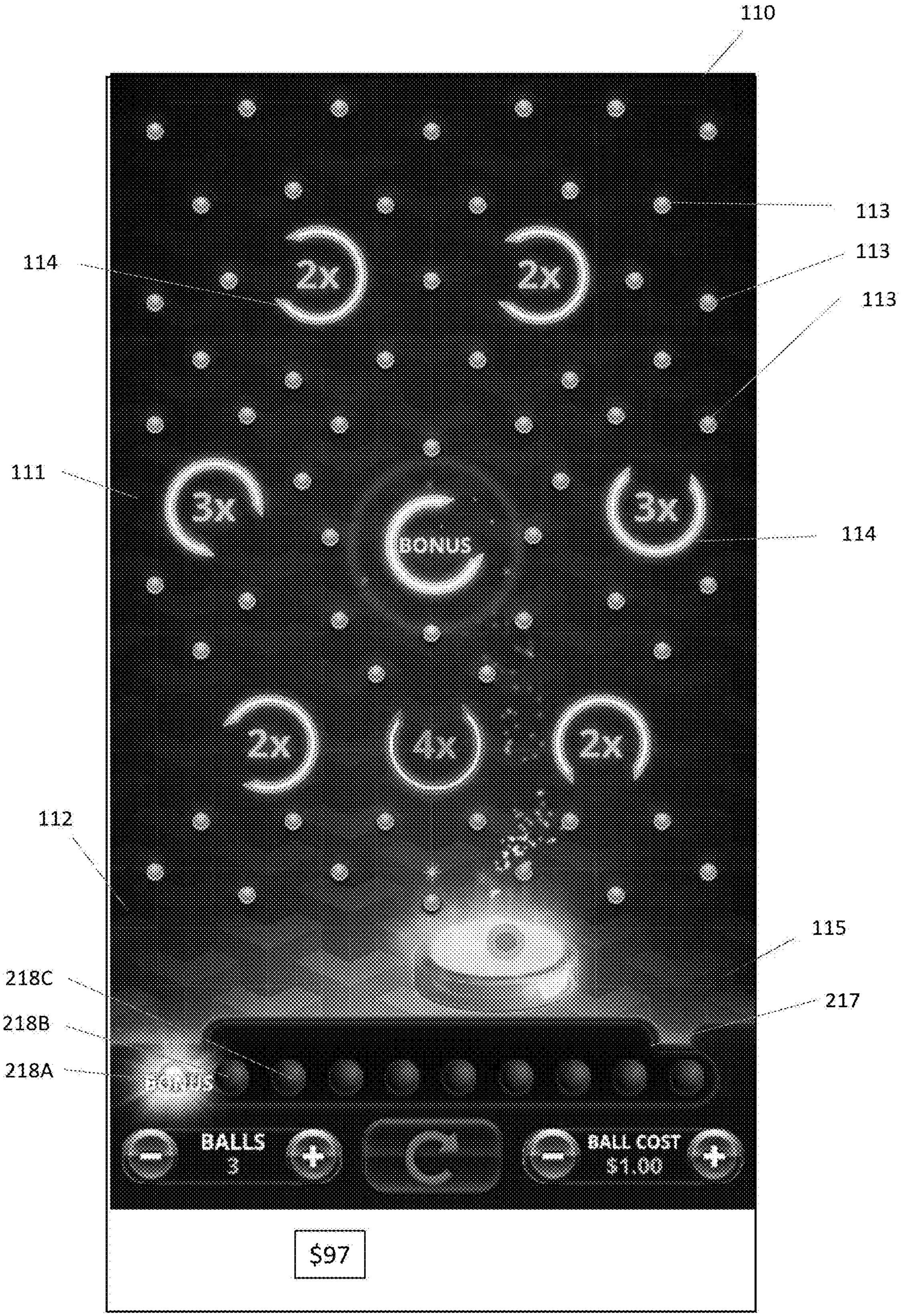
Figure 6C:
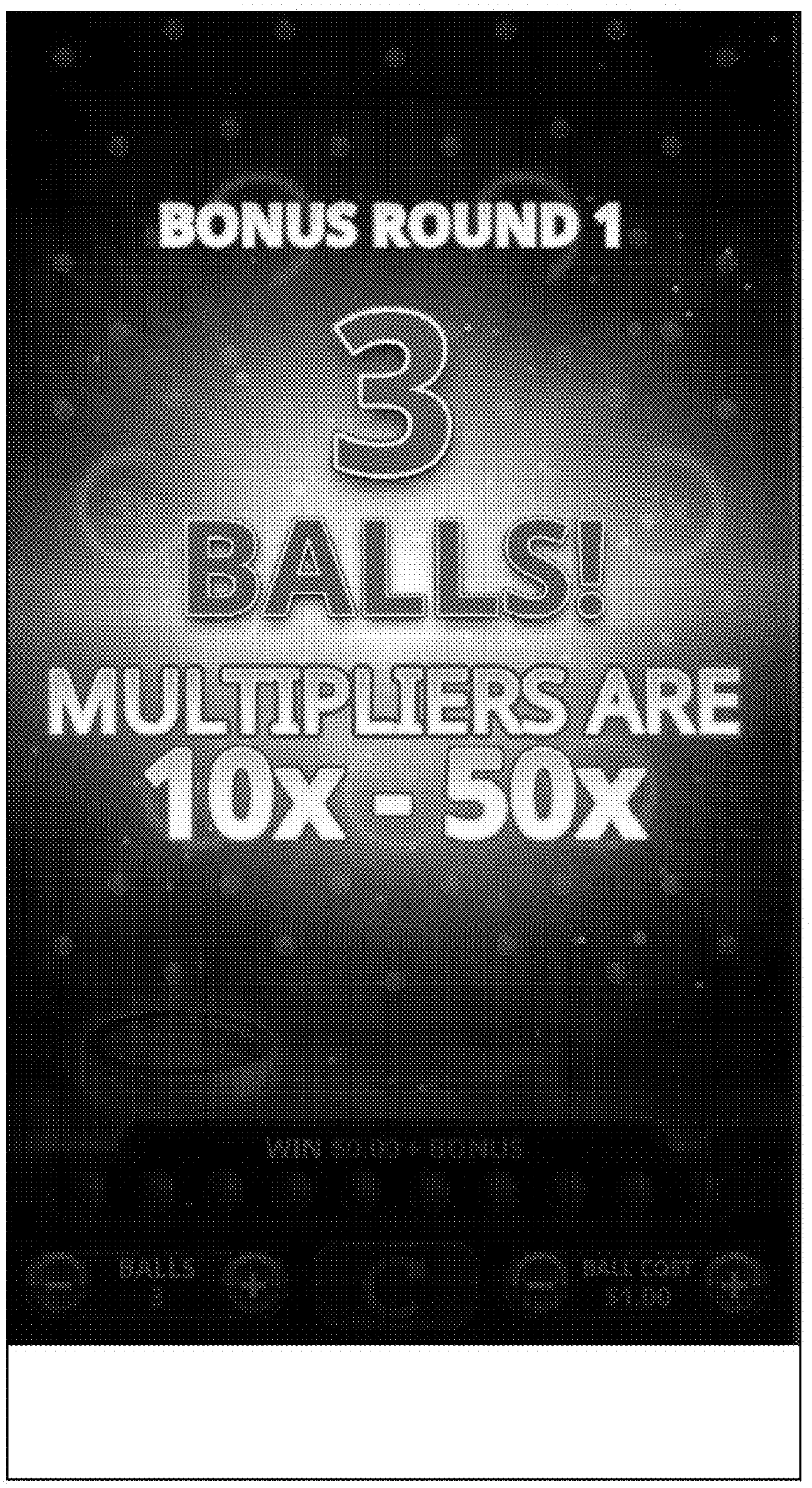
FIG. 6C shows a schematic illustration of a message presented during play of a game.

FIGS. 6A to 6C show schematic illustrations of play of a game executed by the gaming device 100.

As shown in FIG. 6A, one of the balls 616A is caught by the bonus catcher 614. As shown in FIG. 6B, the first ball 616A is caught by the moving structure 115 after being caught by the bonus catcher 614. This catch of at least one ball by the bonus catcher 614 and followed by the moving structure 115 may trigger a bonus round. As an example, in a bonus round, the multiplier values associated with the first group of rotating structures may be increased. As an example, the multiplier values may be increased to one or more values from 10× to 50×. This can be displayed to the user through various user interface methods such as an overlay, popup, or a full-screen message as shown in FIG. 6C.

Figure 7A:
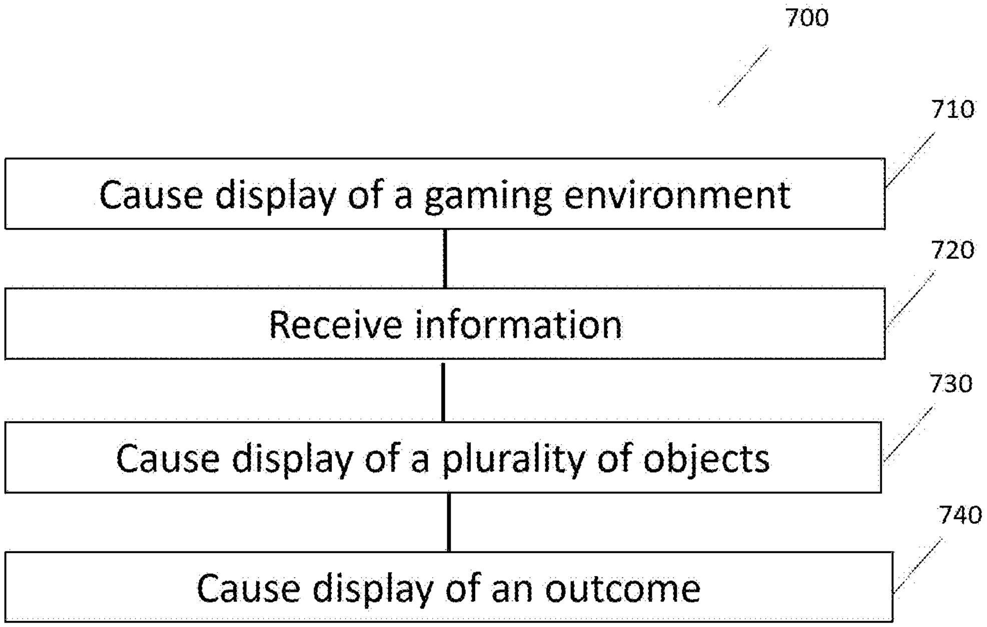
FIG. 7A shows a flow chart of a method for operating a gaming device according to various embodiments.

FIG. 7A shows a flow chart of a method 700 of operating the gaming device. The method 700 may include one or more or all of the features of the gaming device and the play of the game already described in connection with FIGS. 1A to 6C.

The method comprises causing 710 display of a gaming environment on a display device. The gaming environment comprises a plurality of obstacles and a plurality of rotating structures in a first region of the gaming environment, and a moving structure in a second region of the gaming environment. The method further comprises receiving 720 information related to a wager value and information related to a quantity of objects for play of a game. The method further comprises receiving a signal initiating play of a game. The method further comprises causing 730 display of a plurality of objects in the gaming environment. The plurality of obstacles and the plurality of rotating structures influence motion of the plurality of objects in the gaming environment. The plurality of rotating structures are configured for catching and releasing objects in the gaming environment. The method further comprises causing 740 display of a game outcome based on landing outcomes of the plurality of objects with respect to the moving structure.

Figure 7B:
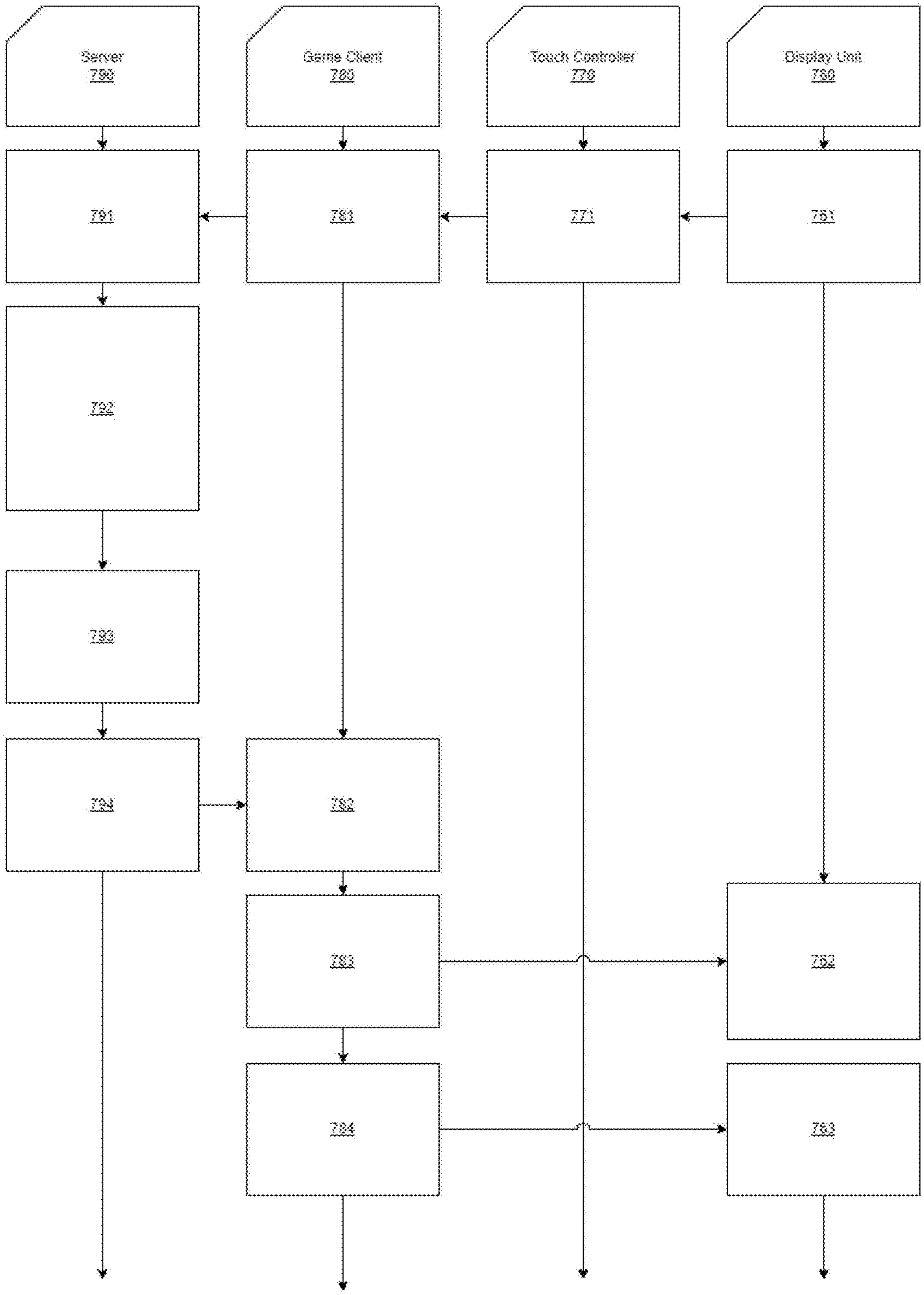
FIG. 7B shows a flow chart of a further method for operating a gaming device according to various embodiments.

FIG. 7B shows a flow chart of a method 750 of operating the gaming device. The method 750 may include one or more or all of the features of the gaming device and the play of the game already described in connection with FIGS. 1A to 7A.

As shown in FIG. 7B, the method 750 may include displaying the gaming environment on a display device or unit 760. The display unit 760 may continuously playback 761 a looping animation where objects on the screen are updated. The user may click 771 play on a touch controller 770 triggering a signal initiating the play of a game. The gaming device (or gaming client) 780 may gather 781 information from the state of the game client, which it sends to a gaming server 790. For example, the gaming device 780 may generate a loop identifier based on the signal initiating play of the game. The loop identifier is based on at least one of a timing of the signal initiating play of the game, the positions of the plurality of rotating structures, and the position of the moving structure. The signal initiating play may be generated by input received by a player activating a "play" button present in the GUI (e.g. by pressing or tapping the play button, for instance) as registered by the touch controller 770.

The method further comprises transmitting, to a gaming server, the information related to the wager value, the information related to the quantity of objects, and the loop identifier. The gaming server 790 may receive 791 the request for the bet amount (wager value), the ball count (object quantity), and the loop identifier.

The method further comprises identifying 792, by the gaming server 790, a data set of a plurality of data sets based on the loop identifier. The method may further include randomly generating 792, by the gaming server, the game outcome based on the received information related to the wager value and the information related to the quantity of objects. For example, a randomly generated number is used, per ball, to determine a game outcome. The method further comprises generating, by the gaming server, animation identifier information, wherein the animation identifier information is based on the identified data set and the randomly generated game outcome. For example, the server loops up animation keys (animation types) that match the win amount per ball per loop point.

The server may confirm 793 that all data, such as the animation keys, is ready to be sent to the gaming client 780. Data may not be ready, for example, if it is not readable or if some data is missing. If all data is not ready the method may further comprise repeating the identification 792 of a dataset of a plurality of data sets based on the loop identifier. This may further include repeating the generating of a random game outcome. If the data is ready to be sent to the gaming client the server may save some or all of the data, such as the game outcome.

The server 790 sends 793 the animation keys and related data to the game client 780. The related data may include all balls in the base game and bonus rounds spawned from base gameplay.

The method further comprises the gaming device 780 receiving 782 animation identifier information from a gaming server 790. The animation identifier information identifies animations to be displayed by the gaming device. The animation identifier information may include animation keys and queues corresponding data. This information may be stored in a data interchange format such as JavaScript Object Notation (JSON) or Extensible Markup Language (XML). The animation identifier information may include the timing data needed to show animations of the game results.

The gaming device 780 confirms 783 that all data has been received and waits for the appropriate time to play back animation based on the loop point. The device will wait until the appropriate loop point is reached to begin playback of the associated animation. The method further comprises selecting, for each respective object, an animation based on the animation identifier information, wherein the animation shows the motion of the object in the gaming environment and its landing outcome.

The method includes displaying 762 game result animations. Animation data, which may also be stored in a data interchange format like JSON or XML, includes location data (where the ball would be over time) and event data (playback animation X and location Y), sound effects (sound fx) triggers over time.

Upon finish of the playback, the game client 780 signals 784 that it is ready to be played again. The screen 760 is updated 763 with an active "play" button so the user can play again.

Figure 8A:
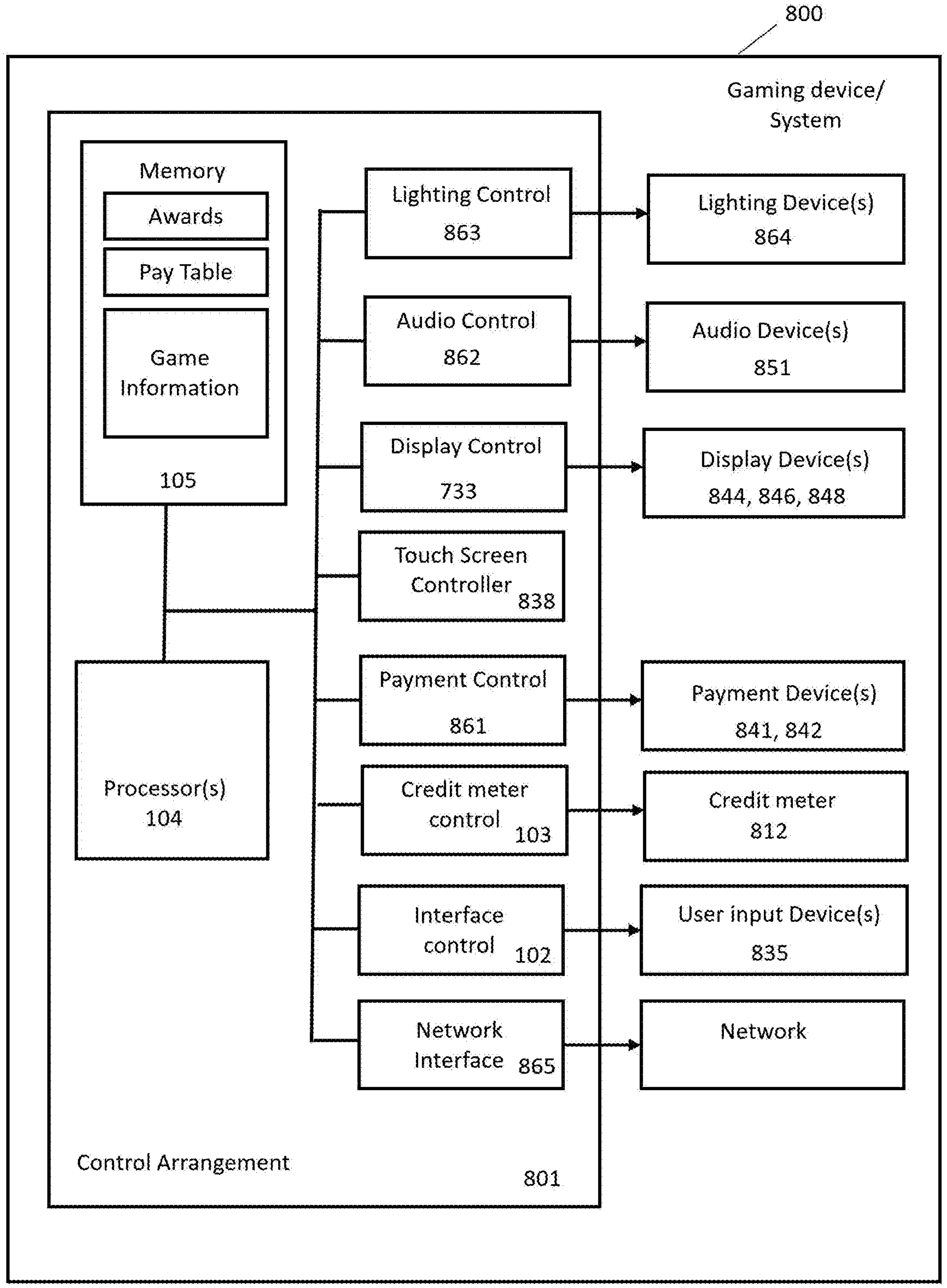
FIGS. 8A and 8B shows a schematic illustration of a gaming system according to various embodiments.
Figure 8B:
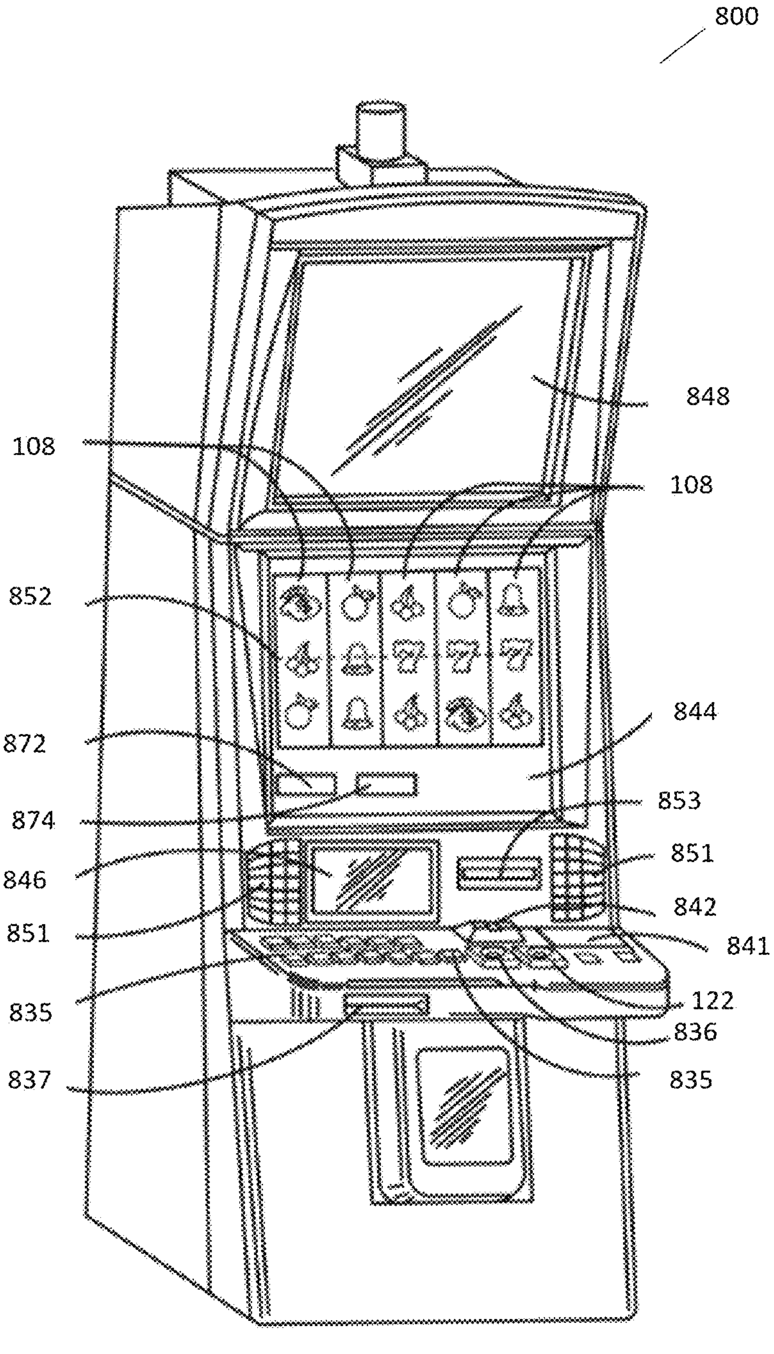

FIGS. 8A and 8B shows schematic illustrations of a gaming device 800 according to various embodiments. The gaming system 800 may include or may be a gaming device (shown in FIG. 8B). The gaming device 800 may include one or more or all of the features of the gaming device and the play of the game already described in connection with FIGS. 1A to 7B.

The gaming device 800 may include game control circuitry 801 which may include the processor arrangement 104 of at least one processor 104. The control arrangement may further include interface control circuitry 102, credit meter control circuitry 103 coupled to a credit meter 812, and memory arrangement 105.

The control arrangement 801 may further include payment control circuitry 861 in communication with at least one payment device 841 of the gaming system 810/gaming device 800. The payment control circuitry 801 may be in communication with the processor arrangement 104. The payment device 841 may accept a physical item associated with a monetary value and may establish or increase a credit balance for the player based on the monetary value. The payment device may be a payment acceptor 841 including a note, ticket, card, and/or bill acceptor wherein the player inserts paper money, a ticket, or voucher, and/or a coin slot 842 where the player inserts money, coins, or tokens. Payment devices such as readers or validators for credit cards, debit cards, and/or credit slips may accept payment. A player may insert an identification card into a card reader of gaming device 800. The identification card may be a smart card having a programmed microchip, a coded magnetic strip, or a coded rewritable magnetic strip, wherein the programmed microchip or magnetic strips are coded with a player's identification, credit totals (or related data), and/or other relevant information.

Optionally, a player may carry a portable device, such as a cell phone, a radio frequency identification tag, or any other suitable wireless device, which communicates a player's identification, credit totals (or related data), and other relevant information to the gaming device 800. Money (or credit) may be transferred to the gaming device 800 through electronic funds transfer. It may be appreciated that if a player funds the gaming device 800, the control arrangement may include payment control circuitry for determining the amount of funds entered and displays the corresponding amount on the credit or other suitable display as described previously.

The gaming device 800 may include at least one input device 835 in communication with the control arrangement 801. Input device(s) 835 may include any suitable device that enables the player to produce an input signal that is received by the control arrangement 801. An input device 835 may be a wager input device, such as a wager button. The player may place a bet by pushing the wager button. A wager button may be a bet one button, which by selecting, the player may wager one credit (i.e., a number of credit points, dollars, cents, etc.). The player may increase the bet by one credit each time the player pushes the bet one button. In response to the player pushing the bet one button, the number of credits shown in the credit display may decrease by one, and the number of credits shown in the bet display may increase by one. Optionally, an input device 835, such as a wager button, may be a bet max button, which may enable the player to bet the maximum wager. Optionally, an input device 835 may be one or more intermediate wager buttons, which may allow a player to bet one or more intermediate wagers that are permitted or accepted for a game of gaming device 800. An input device may be a cash-out button 836. The player may push the cash-out button 836 and initiate a "cash-out" operation to receive a cash payment or other suitable form of payment corresponding to the number of remaining credits. Optionally, in response to the player cashing out, a payment device, such as a ticket, payment, or note generator 837 prints or otherwise generates a ticket or credit slip to provide to the player. The player receives the ticket or credit slip and may redeem the value associated with the ticket or credit slip via a cashier (or another suitable redemption system). Optionally, in response to the player cashing out, the player may receive the coins or tokens in a coin payout tray. Optionally, an input device may be a game activation device (e.g., a play button 122), which is used by the player to start the selected game or sequence of events in the gaming device 800. The play button can be any suitable play activator such as a bet one button, a max bet button, or a repeat the bet button. Optionally, upon appropriate funding, a gaming device 800 may begin the gameplay of a selected game automatically. Optionally, upon the player engaging one of the play buttons, a gaming device 800 automatically activates gameplay. Optionally, a gaming device 800 may include one or more game selection devices, such as one or more game selection buttons and/or one or more pull arms, which may be used by the player to select and/or start a game or sequence of events on the gaming device 800.

Additionally or optionally, the gaming device 800 may include at least one card reader 853 in communication with the at least one processor 104 of the processor arrangement 704. In this embodiment, a player is issued a player identification card, which has an encoded player identification number that uniquely identifies the player. In response to a player inserting their player tracking card into the card reader to begin a gaming session, the card reader reads the player identification number off the player tracking card to identify the player. It should be appreciated that any suitable payout mechanism, such as funding to the player's electronically recordable identification card or smart card, may be implemented in accordance with gaming device 800.

An input device may be a touch-screen display coupled with a touch-screen controller 838 or some other touch-sensitive display overlay to allow for player interaction with the images on a display 734. Optionally, the gaming device 800 may include (e.g., a central display 844, upper display 848, and/or player tracking display 846). The touch-screen display and/or touch-screen controller 833 may be coupled to the video or display controller 733. A player may make decisions and input signals into gaming device 800 by touching the touch-screen at the appropriate locations.

The gaming device 800 may have a support structure, housing, or cabinet, which provides support for a plurality of displays, inputs, controls, and other features of an electronic gaming machine (EGM). Gaming device 800 may be positioned on a base or stand or can be configured as a pub-style tabletop game (not shown) which a player can operate preferably while sitting. It should be appreciated that gaming device 800 may have varying cabinet and display configurations. Optionally, the displays may be preferably connected to or mounted on the cabinet of the gaming device 800. The displays may also serve as digital glass operable to advertise games or other aspects of the gaming establishment. Optionally, the game control circuitry including the at least one processor and/or memory device including game information may reside within the cabinet of the gaming device.

One or more displays of the gaming device may be configured to display a credit balance, which displays a player's current number of credits, cash, account balance, or the equivalent. Additionally or optionally, the gaming device 800 may include a bet display 874, which displays a player's amount wagered. Additionally or optionally, the gaming device 800 may further include a player tracking display 846, which displays information regarding a player's play tracking status. It should be appreciated that these devices are in communication with the processor 104. The at least one display may be a mobile display device, such as a PDA or tablet PC, that enables play of at least a portion of a game at a location remote from gaming device 800 and/or gaming device 800.

The displays 848, 844, 846 may include, without limitation, a monitor, a television display, a plasma display, a liquid crystal display (LCD) a display based on light-emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. Optionally, as described in more detail below, the display includes a touch-screen with an associated touch-screen controller. The displays may be of any suitable size and configuration, such as a square, rectangle, elongated rectangle, oval, etc. The displays 844, 846, 848 of gaming device 800 may be configured to display at least one game and associated images, symbols, and indicia such as any visual representation or exhibition of the movement of objects such as mechanical, virtual, or video reels and wheels, etc., and the like. Optionally, central display 844, upper display 848, and/or player tracking display 846 may be divided into one or more screens or sub-displays, to display one or more games, symbols, graphics, or other images/information. Optionally, the symbols, images, and indicia displayed on or of display(s) may be in mechanical form. That is, the display may include any electromechanical device, such as one or more mechanical objects, such as one or more rotatable wheels or reels 108 configured to display at least one or a plurality of games or other suitable images, symbols, or indicia.

The gaming device 800 may further include audio control circuitry 862. At least one sound-generating device (e.g. audio device 851) may be controlled by one or more sound cards of the audio control circuitry 862. The audio control circuitry 862 may be coupled to and may function in conjunction with the at least one processor 104 and/or gaming control circuitry. Optionally, the sound-generating device may include at least one speaker 851 (e.g., speakers 851 of the gaming device) or other hardware and/or software for generating sounds, such as by playing music for a game(s), or by playing music for other modes of gaming device 800, such as an attract mode. The gaming device 800 may further include lighting control circuitry 863 which may be coupled to one or more lighting devices 864. The gaming device 800 may provide dynamic sounds coupled with attractive multimedia images displayed on one or more of the displays 848, 844, 846 to provide an audio-visual representation or to otherwise display full-motion video with sound to attract players to the gaming device 800. During idle periods, gaming device 800 may display a sequence of audio and/or visual attraction messages to attract potential players to the gaming device 800. The videos may also be customized to provide any appropriate information.

The gaming device 800 may further include a network interface control circuitry 865, which may connect the gaming device 800 to one, or more external devices via a communication network (e.g. a wired or wireless). The gaming device 800 may further include a plurality of communication ports for enabling communication of the processor with external peripherals, such as external video sources, expansion buses, game or other displays, a SCSI port, or a keypad.

Gaming device 800 may incorporate any suitable wagering game(s). Gaming device 800 may include some or all of the features of conventional gaming machines or devices (e.g., slot machines). A game(s) on the gaming device 800 may be any suitable reel-type game susceptible to representation in an electronic or electromechanical form, which may produce a random outcome based on pay-out probability data at the time of or after placement of a wager. Alternatively, game(s) may be a video poker game, a video bingo or keno game, a Class II game displayed using Class III visual elements (e.g., a video slot game that uses a bingo-based ball call), or any other suitable game.

Optionally, in addition to winning credits or other awards in a game on the gaming device 800, the gaming device may also give players the opportunity to win credits in a bonus or a secondary round of a game. The bonus or secondary round enables the player to obtain a prize or payout in addition to the prize or payout, if any, obtained from the base or primary round of the game. In general, a bonus or secondary round produces a significantly higher level of player excitement than the base or primary round of the game because it provides a greater expectation of winning than the base or primary round, and is accompanied by more attractive or unusual features than the base or primary round. It should be appreciated that, in one embodiment, the bonus or secondary round is similar to the base or primary round.

Figure 9:
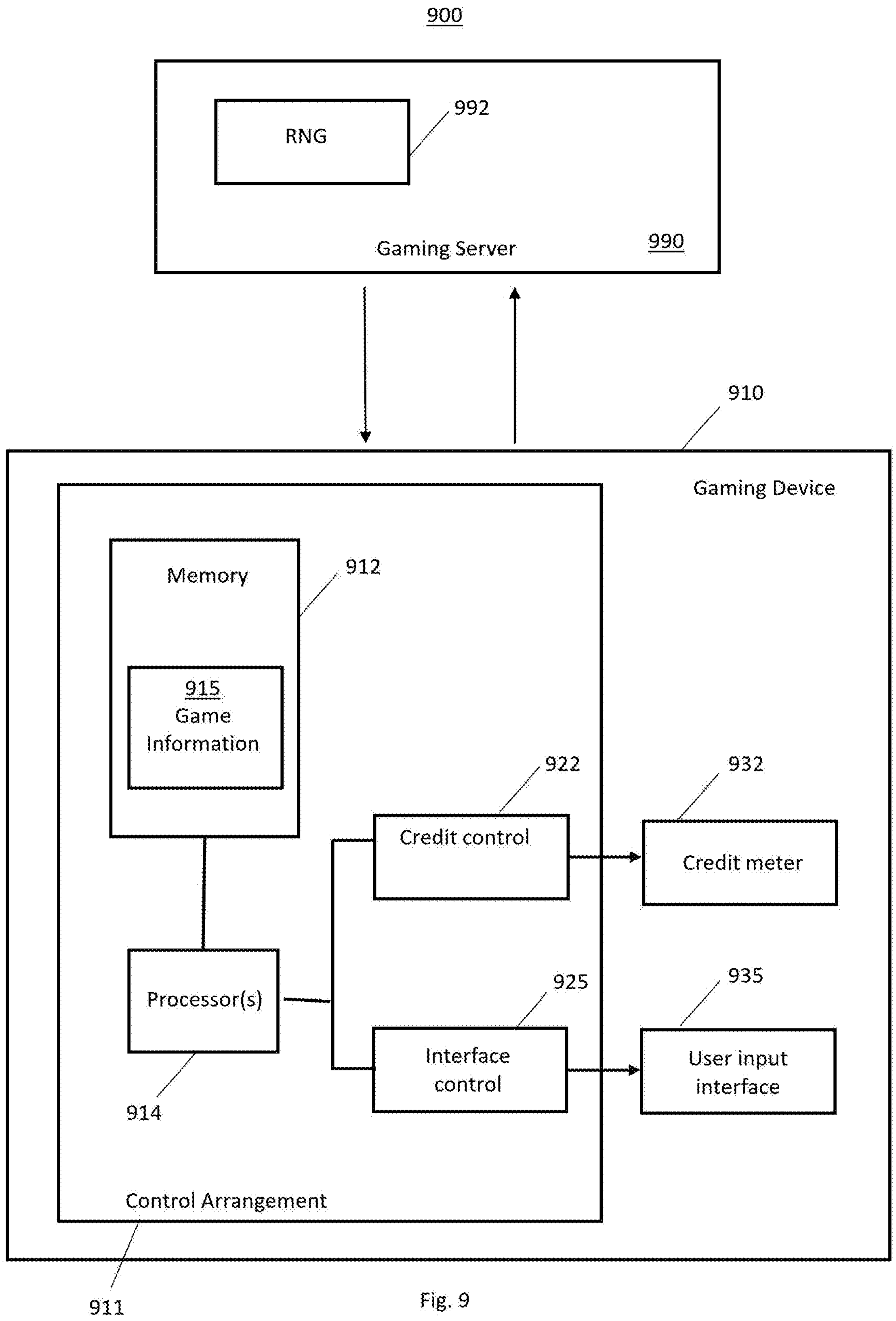
FIG. 9 shows a schematic illustration of a gaming system according to various embodiments.

FIG. 9 shows schematic illustrations of a system or a gaming system 900 according to various embodiments. The system 900 may comprise a computer program or gaming device 910 comprising a computer-readable storage medium and a gaming server 990 comprising a random number generator 992 for generating the outcome of the game based on the information related to the wager value and the information related to the quantity of objects. The gaming system 900 includes one or more or all of the features of the gaming device and the play of the game already described in connection with FIGS. 1A to 8B.

The server 990 may receive information related to the wager value, the information related to the quantity of objects, and the loop identifier from a gaming device 910. The server 990 may send animation identifier information to the gaming device 910, wherein the animation identifier information identifies animations to be displayed by the processor. The server 990 may be configured to identify a data set of a plurality of data sets based on the loop identifier, and generate animation identifier information, wherein the animation identifier information is based on the identified data set and the randomly generated outcome of the game. The identified data and the plurality of data sets may be stored on the gaming server 990.

The gaming device 910 may comprise a processor arrangement 914 comprising at least one processor, and a memory arrangement 912 for storing a plurality of instructions 915, which when executed by the processor arrangement 914, causes the processor arrangement 914 to (a) cause display of a gaming environment on a display device, wherein the gaming environment comprises a plurality of obstacles and a plurality of rotating structures in a first region of the gaming environment, and a moving structure in a second region of the gaming environment;

(b) receive information related to a wager value and information related to a quantity of objects for play of a game;

(c) cause display of a plurality of objects in the gaming environment, wherein the plurality of obstacles and the plurality of rotating structures influence motion of the plurality of objects in the gaming environment, wherein the plurality of rotating structures are configured for catching and releasing objects in the gaming environment;

(d) cause display of an outcome of the game based on landing outcomes of the plurality of objects with respect to the moving structure.

The gaming device 910 may include game control circuitry 911 which may include the processor arrangement 914 of at least one processor 914. The control arrangement 911 may further include interface control circuitry 925, credit meter control circuitry 922 coupled to a credit meter 932, and memory arrangement 912.

Gaming device 910 may include at least one input device 935 in communication with the control arrangement 911. Input device(s) 935 may include any suitable device that enables the player to produce an input signal that is received by the control arrangement 911. An input device 935 may be a wager input device, such as a wager button. The player may place a bet by pushing the wager button. Wager button may be a bet one button, which by selecting, the player may wager one credit (i.e., a number of credit points, dollars, cents, etc.). The player may increase the bet by one credit each time the player pushes the bet one button. In response to the player pushing the bet one button, the number of credits shown in the credit display may decrease by one, and the number of credits shown in the bet display may increase by one.

Optionally, an input device 935, such as a wager button, may be a bet max button, which may enable the player to bet the maximum wager. Optionally, an input interface 935 may be one or more intermediate wager buttons, which may allow a player to bet one or more intermediate wagers that are permitted or accepted for a game of gaming device 910. Optionally, an input device may be a game activation device (e.g., a play button 122), which is used by the player to start the selected game or sequence of events in the gaming device 910. The play button can be any suitable play activator such as a bet one button, a max bet button, or a repeat the bet button. Optionally, upon appropriate funding, the gaming device 910 may begin the gameplay of a selected game automatically. Optionally, upon the player engaging one of the play buttons, gaming device 910 automatically activates gameplay. Optionally, a gaming device 910 may include one or more game selection devices, such as one or more game selection buttons and/or one or more pull arms, which may be used by the player to select and/or start a game or sequence of events on the gaming device 910.

The following examples pertain to further embodiments, from which numerous permutations and configurations will be apparent, and whose scope of subject matter is defined by the appended claims.

An example (e.g. example 1) relates to a device or a gaming device comprising a processor arrangement comprising at least one processor, and a memory arrangement for storing a plurality of instructions. The instructions, when executed by the processor arrangement, cause the processor arrangement to cause display of a gaming environment or a graphical user interface on a display device. The gaming environment comprises a plurality of obstacles and a plurality of rotating structures in a first region of the gaming environment, and a moving structure in the second region of the gaming environment. The instructions further cause a processor arrangement to receive information related to a wager value and information related to a quantity of objects for play of a game and cause display of a plurality of objects in the gaming environment. The plurality of obstacles and the plurality of rotating structures influence motion of the plurality of objects in the gaming environment, wherein the plurality of rotating structures are configured for catching and releasing objects in the gaming environment. The instructors further cause display of an outcome of the game based on landing outcomes of the plurality of objects with respect to the moving structure.

Another example (e.g. example 2) relates to a previously described example (e.g. example 1) or any of the examples described herein and may further include that the plurality of rotating structures are positioned at respective locations in the first region of the gaming environment, wherein a rotating structure rotates around its respective location.

Another example (e.g. example 3) relates to a previously described example (e.g. one of the examples 1-2) or any of the examples described herein and may further include that the moving structure travels between a first position of the second region and a second position of the second region of the gaming environment.

Another example (e.g. example 4) relates to a previously described example (e.g. example 3) or any of the examples described herein and may further include that each rotating structure completes a rotation loop in a time period, and that the moving structure completes a travel loop between the first position and the second position in the second region in the time period.

Another example (e.g. example 5) relates to a previously described example (e.g. one of the examples 1-4) or any of the examples described herein and may further include that to influence the motion of the plurality of objects comprises to alter at least one of a trajectory, spin, speed, and direction of the plurality of objects.

Another example (e.g. example 6) relates to a previously described example (e.g. one of the examples 1-5) or any of the examples described herein and may further include that the motion of the plurality of objects is influenced based on interactions between the plurality of objects and the plurality of obstacles.

Another example (e.g. example 7) relates to a previously described example (e.g. one of the examples 1-6) or any of the examples described herein and may further include that the plurality of objects comprises a plurality of balls falling through the gaming environment from the first region towards the second region.

Another example (e.g. example 8) relates to a previously described example (e.g. one of the examples 1-7) or any of the examples described herein and may further include that the plurality of rotating structures and the moving structure are a receptacular or bowl-like structure for catching one or more objects of the plurality of objects.

Another example (e.g. example 9) relates to a previously described example (e.g. one of the examples 1-8) or any of the examples described herein and may further include that a landing outcome of an object with respect to the moving structure comprises landing outside the moving structure or landing inside the moving structure.

Another example (e.g. example 10) relates to a previously described example (e.g. one of the examples 1-9) or any of the examples described herein and may further include that the processor arrangement is configured to receive, via interface control circuitry in communication with a user input interface, the information related to the wager value, the information related to the quantity of objects, and a signal initiating play of the game, wherein the processor arrangement causes display of the plurality of objects in the gaming environment based on the signal initiating play of the game.

Another example (e.g. example 11) relates to a previously described example (e.g. one of the examples 1-10) or any of the examples described herein and may further include that the processor arrangement generates a loop identifier based on the signal initiating play of the game.

Another example (e.g. example 12) relates to a previously described example (e.g. example 11) or any of the examples described herein and may further include that the loop identifier is based on at least one of a timing of the signal initiating play of the game, the positions of the plurality of rotating structures, and the position of the moving structure.

Another example (e.g. example 13) relates to a previously described example (e.g. one of the examples 1-12) or any of the examples described herein and may further include that the processor arrangement causes random generation of the outcome of the game based on the information related to the wager value, the information related to the quantity of objects.

Another example (e.g. example 14) relates to a previously described example (e.g. one of the examples 11-13) or any of the examples described herein and may further include that the processor arrangement is configured to transmit to a gaming server, the information related to the wager value, the information related to the quantity of objects, and the loop identifier.

Another example (e.g. example 15) relates to a previously described example (e.g. one of the examples 11-14) or any of the examples described herein and may further include that the processor arrangement is configured to receive animation identifier information from a gaming server, wherein the animation identifier information identifies animations to be displayed by the processer.

Another example (e.g. example 16) relates to a previously described example (e.g. example 15) or any of the examples described herein and may further include that the animation identifier information is generated from an identified data set of a plurality of data sets stored on the gaming server, wherein the data set is identified from the plurality of data sets based on the loop identifier, and wherein the animation identifier information is generated from the identified data set based on a randomly generated outcome of the game.

Another example (e.g. example 17) relates to a previously described example (e.g. one of the examples 15-16) or any of the examples described herein and may further include that the processor arrangement is configured to select, for each respective object, an animation based on the animation identifier information, wherein the animation shows the motion of the object in the gaming environment and the landing outcome of the object with respect to the moving structure.

Another example (e.g. example 18) relates to a previously described example (e.g. one of the examples 1-17) or any of the examples described herein and may further include that the outcome of the game is based on an object multiplier value associated with each respective object of the plurality of objects, wherein the object multiplier value is based on catching outcomes of the object by the plurality of rotating structures and the landing outcome of the object in the moving structure.

Another example (e.g. example 19) relates to a previously described example (e.g. example 18) or any of the examples described herein and may further include that each rotating structure of the plurality of rotating structures is associated with a multiplier value, and wherein the object multiplier value is based on the multiplier value of one or more rotating structures catching the object.

Another example (e.g. example 20) relates to a previously described example (e.g. one of the examples 18-19) or any of the examples described herein and may further include that the object multiplier value is based on a summation of the multiplier values of one or more rotating structures catching the object, wherein the object is also caught by the moving structure.

Another example (e.g. example 21) relates to a previously described example (e.g. one of the examples 18-20) or any of the examples described herein and may further include that the outcome of the game is based on a summation of the object multiplier values for the plurality of objects in the play of the game.

Another example (e.g. example 22) relates to a previously described example (e.g. one of the examples 1-21) or any of the examples described herein and may further include that the processor arrangement is configured to cause an update of a credit meter based on the outcome of the game.

An example (e.g. example 23) relates to a method of operating a gaming device, the method comprising causing display of a gaming environment on a display device, wherein the gaming environment comprises a plurality of obstacles and a plurality of rotating structures in a first region of the gaming environment, and a moving structure in a second region of the gaming environment. The method additionally comprises receiving information related to a wager value and information related to a quantity of objects for play of a game, receiving a signal initiating play of a game, and causing display of a plurality of objects in the gaming environment, wherein the plurality of obstacles and the plurality of rotating structures influence motion of the plurality of objects in the gaming environment and wherein the plurality of rotating structures are configured for catching and releasing objects in the gaming environment. The method further comprises causing display of an outcome of the game based on landing outcomes of the plurality of objects with respect to the moving structure.

Another example (e.g. example 24) relates to a previously described example (e.g. example 23) or any of the examples described herein and may further include generating a loop identifier based on the signal initiating play of the game.

Another example (e.g. example 25) relates to a previously described example (e.g. one of the examples 23-24) or any of the examples described herein and may further include that the loop identifier is based on at least one of: a timing of the signal initiating play of the game, the positions of the plurality of rotating structures, and the position of the moving structure.

Another example (e.g. example 26) relates to a previously described example (e.g. one of the examples 24-25) or any of the examples described herein and may further include transmitting, to a gaming server, the information related to the wager value, the information related to the quantity of objects, and the loop identifier.

Another example (e.g. example 27) relates to a previously described example (e.g. one of the examples 24-26) or any of the examples described herein and may further include randomly generating, by the gaming server, the outcome of the game based on the information related to the wager value and the information related to the quantity of objects.

Another example (e.g. example 28) relates to a previously described example (e.g. one of the examples 24-27) or any of the examples described herein and may further include receiving animation identifier information from a gaming server, wherein the animation identifier information identifies animations to be displayed by the gaming device.

Another example (e.g. example 29) relates to a previously described example (e.g. example 28) or any of the examples described herein and may further include identifying, by the gaming server, a data set of a plurality of data sets based on the loop identifier, generating, by the gaming server, animation identifier information, wherein the animation identifier information is based on the identified data set and the randomly generated outcome of the game.

Another example (e.g. example 30) relates to a previously described example (e.g. one of the examples 28-29) or any of the examples described herein and may further include selecting, for each respective object, an animation based on the animation identifier information, wherein the animation shows the motion of the object in the gaming environment and its landing outcome.

Another example (e.g. example 31) relates to a gaming apparatus comprising means for carrying out the method of a previously described example (e.g. one of the examples 23-30) or any of the examples described herein.

Another example (e.g. example 32) relates to a computer program comprising instructions which, when the program is executed by a computer, cause the computer to carry out the method of a previously described example (e.g. one of the examples 23-30) or any of the examples described herein.

Another example (e.g. example 33) relates to a non-transitory, computer-readable storage medium storing a plurality of instructions, which when executed by a processor, causes the processor to perform the method of a previously described example (e.g. one of the examples 23-30) or any of the examples described herein.

An example (e.g. example 34) relates to a system or a gaming system, comprising a gaming device comprising the computer-readable storage medium according to a previously described example (e.g. example 33) or the computer program according to a previously described example (e.g. example 32), and a gaming server comprising a random number generator for generating the outcome of the game based on the information related to the wager value and the information related to the quantity of objects.

Another example (e.g. example 35) relates to the system according to a previously described example (e.g. example 34) or any of the examples described herein, wherein the processor arrangement generates a loop identifier based on the signal initiating play of the game, and wherein the gaming server is configured to identify a data set of a plurality of data sets based on the loop identifier, and generate animation identifier information, wherein the animation identifier information is based on the identified data set and the randomly generated outcome of the game.

Another example (e.g. example 36) relates to a previously described example (e.g. one of the examples 34-35) or any of the examples described herein and may further include that the loop identifier is based on at least one of: a timing of the signal initiating play of the game, the positions of the plurality of rotating structures, and the position of the moving structure.

Another example (e.g. example 37) relates to a previously described example (e.g. example 2) or any of the examples described herein, wherein each respective object of the plurality of objects indicates its object multiplier value with a visual property.

Another example (e.g. example 38) relates to a previously described example (e.g. example 3) or any of the examples described herein, wherein each rotating structure of the plurality of rotating structures is associated with a visual property that denotes its multiplier value.

Another example (e.g. example 39) relates to a previously described example (e.g. one of the examples 37-38) or any of the examples described herein and may further include that a visual property comprises at least one of a color, trail, hue, brightness, or typography.

The aspects and features described in relation to a particular one of the previous examples may be combined with one or more of the further examples to replace an identical or similar feature of that further example or to additionally introduce the features into the further example.

The methodologies described herein may be implemented by various means depending upon applications according to particular examples. For example, such methodologies may be implemented in hardware, firmware, software, or combinations thereof. In a hardware implementation, for example, the controller or processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Unless specifically stated otherwise, as apparent from the discussion herein, it is appreciated that throughout this specification discussions utilizing terms such as "processing," "computing." "calculating." "determining" or the like refer to actions or processes of a processor, such as a processor on a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or displays of the special purpose computer or similar special purpose electronic computing device.

For clarity in discussing the various functions of the system, multiple computers and/or servers are discussed as performing different functions. These different computers (or servers) may, however, be implemented in multiple different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The function terminology is used solely for purposes of naming convention and to distinguish one element from another in the following discussion. Unless otherwise specified, the name of an element conveys no specific functionality to the element or component. It should be appreciated that, optionally, the software, hardware, and associated components of the system may be programmed and configured to implement one or more embodiments described herein. It should also be appreciated that the various aspects of the system may be exemplified as software, modules, nodes, etc., of a computer or server.

The gaming systems and methods described herein may be implemented in various configurations for gaming machines, gaming devices, or gaming systems, including but not limited to: (1) a dedicated gaming machine, gaming device, or gaming system wherein the computerized instructions for controlling any games (which may be provided by the gaming machine or gaming device) are provided with the gaming machine or gaming device prior to delivery to a gaming establishment; and (2) a changeable gaming machine, gaming device, or gaming system wherein the computerized instructions for controlling any games (which may be provided by the gaming machine or gaming device) are downloadable to the gaming machine or gaming device through a data network after the gaming machine or gaming device is in a gaming establishment. Optionally, the computerized instructions for controlling any games are executed by at least one central server, central controller, or remote host. In such "thin client" embodiments, the central server remotely controls any games (or other suitable interfaces) and the gaming system is utilized to display such games (or suitable interfaces) and/or receive one or more inputs or commands from a player. Optionally, the computerized instructions for controlling any games are communicated from the central server, central controller, or remote host to a gaming device local processor and memory devices. In such "thick client" embodiments, the gaming device local processor executes the communicated computerized instructions to control any games (or other suitable interfaces) provided to a player.

Examples may further be or relate to a (computer) program including a program code to execute one or more of the above methods when the program is executed on a computer, processor, or another programmable hardware component. Thus, steps, operations, or processes of different ones of the methods described above may also be executed by programmed computers, processors, or other programmable hardware components. Examples may also cover program storage devices, such as non-transitory digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. They may include any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

The terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware and/or software component.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes, or -operations.

If some aspects have been described in relation to a device or system, these aspects should also be understood as a description of the corresponding method. For example, a block, device, or functional aspect of the device or system may correspond to a feature, such as a method step, of the corresponding method. Accordingly, aspects described in relation to a method shall also be understood as a description of a corresponding block, a corresponding element, a property, or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A device, comprising:

a processor arrangement comprising at least one processor; and a memory arrangement for storing a plurality of instructions, which when executed by the processor arrangement, causes the processor arrangement to:

cause display of a graphical user interface on a display device, wherein the graphical user interface comprises an environment comprising a plurality of obstacles and a plurality of rotating structures in a first region of the environment, and a moving structure in a second region of the graphical user interface, wherein the processor arrangement is configured to continuously playback a looping animation in the graphical user interface;

receive information related to a wager value and information related to a quantity of objects for play of a game;

in response to a signal initiating play of the game, generate a loop identifier based on positions of the plurality of rotating structures and a position of the moving structure at a time of the signal;

transmit the loop identifier to a remote server;

receive animation identifier information from the remote server, wherein the animation identifier information is based on the loop identifier;

cause display of a plurality of objects in the environment, wherein the plurality of obstacles and the plurality of rotating structures influence motion of the plurality of objects in the environment, wherein the plurality of rotating structures are configured for catching and releasing objects in the environment; and cause display of an outcome of the game based on the loop identifier and landing outcomes of the plurality of objects with respect to the moving structure, wherein the processor arrangement utilizes the animation identifier information to wait until a loop point of the looping animation to begin playback of the outcome.

2. The device according to claim 1, wherein the outcome of the game is based on an object multiplier value associated with each respective object of the plurality of objects, wherein the object multiplier value is based on catching outcomes of the object by the plurality of rotating structures and the landing outcome of the object in the moving structure.

3. The device according to claim 2, wherein the object multiplier value is based on a summation of the multiplier values of one or more rotating structures catching the object, wherein the object is also caught by the moving structure.

4. The device according to claim 3, wherein each rotating structure of the plurality of rotating structures is associated with a visual property that denotes its multiplier value.

5. The device according to claim 4, wherein a visual property comprises at least one of a color, trail, hue, brightness, or typography.

6. The device according to claim 2, wherein the outcome of the game is based on a summation of the object multiplier values for the plurality of objects in play of the game.

7. The device according to claim 2, wherein each respective object of the plurality of objects indicates its object multiplier value with a visual property.

8. The device according to claim 2, wherein each rotating structure of the plurality of rotating structures is associated with a multiplier value, and wherein the object multiplier value is based on the multiplier value of one or more rotating structures catching the object.

9. The device according to claim 1, wherein the plurality of rotating structures are positioned at respective locations in the first region of the environment, wherein a rotating structure rotates around its respective location.

10. The device according to claim 1, wherein the moving structure travels between a first position of the second region and a second position of the second region of the environment.

11. The device according to claim 10, wherein each rotating structure completes a rotation loop in a time period, and wherein the moving structure completes a travel loop between the first position and the second position in the second region in the time period.

12. The device according to claim 1, wherein the processor arrangement generates the loop identifier based on a timing of the signal initiating play of the game, the positions of the plurality of rotating structures, and the position of the moving structure.

13. The device according to claim 1, wherein to influence the motion of the plurality of objects comprises to alter at least one of a trajectory, spin, speed, and direction of the plurality of objects, and wherein the motion of the plurality of objects is influenced based on interactions between the plurality of objects and the plurality of obstacles.

14. The device according to claim 1, wherein the plurality of objects comprises a plurality of balls falling through the environment from the first region towards the second region.

15. The device according to claim 1, wherein the plurality of rotating structures and the moving structure are a receptacular or bowl-like structure for catching one or more objects of the plurality of objects.

16. The device according to claim 1, wherein a landing outcome of an object with respect to the moving structure comprises:

landing outside the moving structure, or landing inside the moving structure.

17. The device according to claim 1, wherein the processor arrangement is configured to:

receive, via interface control circuitry in communication with a user input interface, the information related to the wager value, the information related to the quantity of objects, and the signal initiating play of the game, wherein the processor arrangement causes display of the plurality of objects in the environment based on the signal initiating play of the game.

18. A method of operating a device, the method comprising:

causing display of a graphical user interface on a display device, wherein the graphical user interface comprises an environment comprising a plurality of obstacles and a plurality of rotating structures in a first region of the graphical user interface, and a moving structure in a second region of the graphical user interface, wherein a looping animation in the graphical user interface is continuously played back;

receiving information related to a wager value and information related to a quantity of objects for play of a game;

receiving a signal initiating play of a game and, in response to the signal, generating a loop identifier based on positions of the plurality of rotating structures and a position of the moving structure at a time of the signal;

transmitting the loop identifier to a remote server;

receiving animation identifier information from the remote server, wherein the animation identifier information is based on the loop identifier;

causing display of a plurality of objects in the graphical user interface, wherein the plurality of obstacles and the plurality of rotating structures influence motion of the plurality of objects in the graphical user interface, wherein the plurality of rotating structures are configured for catching and releasing objects in the graphical user interface; and causing display of an outcome of the game based on the loop identifier and landing outcomes of the plurality of objects with respect to the moving structure, wherein the animation identifier information is utilized to wait until a loop point of the looping animation to begin playback of the outcome.

19. A non-transitory, computer-readable storage medium storing a plurality of instructions that, when executed by a processor, causes the processor to perform the method of claim 18.

* * * * *